US012772259B2

(12) United States Patent
Chen et al.

(10) Patent No.: US 12,772,259 B2
(45) Date of Patent: Oct. 20, 2026

(54) SOUNDING REFERENCE SIGNAL RESOURCE SET CONFIGURATION

(71) Applicant: QUALCOMM Incorporated, San Diego, CA (US)

(72) Inventors: Yitao Chen, San Marcos, CA (US); Mostafa Khoshnevisan, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 277 days.

(21) Appl. No.: 18/614,914

(22) Filed: Mar. 25, 2024

(65) Prior Publication Data

US 2024/0349297 A1 Oct. 17, 2024

Related U.S. Application Data

(60) Provisional application No. 63/495,703, filed on Apr. 12, 2023.

(51) Int. Cl.
*H04W 72/232* (2023.01)
*H04L 5/00* (2006.01)
(Continued)

(52) U.S. Cl.
CPC ......... *H04W 72/232* (2023.01); *H04L 5/0051* (2013.01); *H04W 72/0446* (2013.01); *H04W 72/1268* (2013.01)

(58) Field of Classification Search
CPC ........... H04W 72/232; H04W 72/0446; H04W 72/1268; H04L 5/0051; H04L 5/001; H04L 5/0053; H04L 5/0094
See application file for complete search history.

(56) References Cited

U.S. PATENT DOCUMENTS

| | | | |
|---|---|---|---|
| 11,737,112 | B2 | 8/2023 | Khoshnevisan et al. |
| 2020/0351129 | A1 | 11/2020 | Kwak et al. |

(Continued)

FOREIGN PATENT DOCUMENTS

| | | | |
|---|---|---|---|
| WO | 2022006833 | A1 | 1/2022 |
| WO | 2022085155 | A1 | 4/2022 |
| WO | 2023102302 | | 6/2023 |

OTHER PUBLICATIONS

3GPP TS 38.214: "3rd Generation Partnership Project, Technical Specification Group Radio Access Network, NR, Physical Layer Procedures for Data (Release 17)", V17.5.0, Mar. 30, 2023, pp. 1-231.

(Continued)

*Primary Examiner* — Chuong A Ngo
(74) *Attorney, Agent, or Firm* — Harrity & Harrity, LLP

(57) ABSTRACT

Various aspects of the present disclosure generally relate to wireless communication. In some aspects, a user equipment (UE) may obtain configuration information that indicates, for downlink control information (DCI) having a first DCI format, a first sounding reference signal (SRS) resource set associated with a first control resource set (CORESET) pool index value and a second SRS resource set associated with a second CORESET pool index value. The UE may identify whether DCI having a second DCI format is configured with a third SRS resource set associated with the first CORESET pool index value or is configured with the third SRS resource set and a fourth SRS resource set associated with the second CORESET pool index value. The UE may selectively transmit a first transmission and a second transmission that at least partially overlap in a time domain within a component carrier. Numerous other aspects are described.

30 Claims, 13 Drawing Sheets

(51) Int. Cl.
*H04W 72/0446* (2023.01)
*H04W 72/1268* (2023.01)

(56) References Cited

U.S. PATENT DOCUMENTS

| | | | | |
|---|---|---|---|---|
| 2021/0289525 | A1* | 9/2021 | Khoshnevisan | H04L 1/1822 |
| 2022/0417980 | A1 | 12/2022 | Cirik et al. | |
| 2023/0023982 | A1 | 1/2023 | Kim et al. | |
| 2023/0045905 | A1 | 2/2023 | Lim et al. | |
| 2023/0232481 | A1* | 7/2023 | Park | H04B 7/06968 370/329 |
| 2023/0397226 | A1 | 12/2023 | Matsumura et al. | |

OTHER PUBLICATIONS

CATT: "Further Discussions on Unified TCI Framework Extension for Multi-TRP Operation", R1-2300650, 3GPP TSG RAN WG1 #112 Athens, Greece, Feb. 27-Mar. 3, 2023, 12 Pages.
International Search Report and Written Opinion—PCT/US2024/021443—ISA/EPO—Jul. 9, 2024.
Moderator (Oppo): "Summary #2 on Rel-18 STxMP", R1-2212580, 3GPP TSG RAN WG1 #111 Toulouse, France, Nov. 14-18, 2022, 89 Pages.
Qualcomm Incorporated: "Simultaneous Multi-panel Transmission", R1-2301400, 3GPP TSG RAN WG1 #112 Athens, Greece, Feb. 27-Mar. 3, 2023, pp. 1-20.
Qualcomm Incorporated: "Simultaneous Multi-panel Transmission", R1-2303578, 3GPP TSG RAN WG1 #112bis-e e-Meeting, Apr. 17-Apr. 26, 2023, pp. 1-19.
Vivo: "Remaining Issues on Multi-TRP for PDCCH, PUCCH and PUSCH Enhancements", R1-2110991, 3GPP TSG RAN WG1 #107-e e-Meeting, Nov. 11-19, 2021, 21 Pages.

* cited by examiner

SOUNDING REFERENCE SIGNAL RESOURCE SET CONFIGURATION

CROSS-REFERENCE TO RELATED APPLICATION

This Patent application claims priority to U.S. Provisional Patent Application No. 63/495,703, filed on Apr. 12, 2023, entitled "SOUNDING REFERENCE SIGNAL RESOURCE SET CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sounding reference signal resource set configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
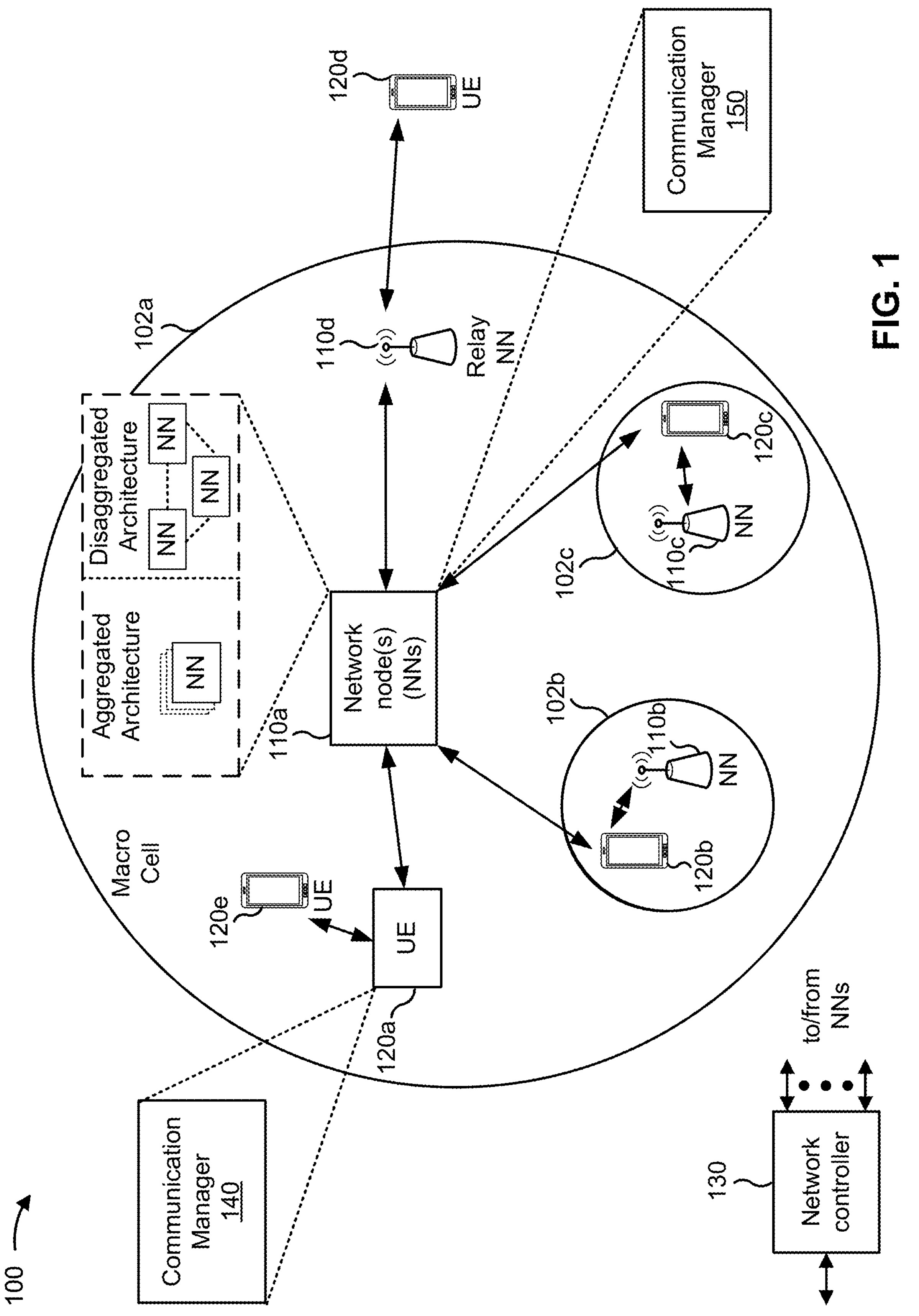
FIG. 1 is a diagram illustrating an example of a wireless network, in accordance with the present disclosure.

Some aspects described herein relate to a method of wireless communication performed by a user equipment (UE). The method may include obtaining configuration information that indicates, for downlink control information (DCI) having a first DCI format, a first sounding reference signal (SRS) resource set associated with a first control resource set (CORESET) pool index value and a second SRS resource set associated with a second CORESET pool index value. The method may include identifying whether DCI having a second DCI format is configured only with a third SRS resource set associated with the first CORESET pool index value or is configured with both the third SRS resource set associated with the first CORESET pool index value and a fourth SRS resource set associated with the second CORESET pool index value. The method may include selectively transmitting, in accordance with at least one of the DCI having the first DCI format or the DCI having the second DCI format, a first physical uplink shared channel (PUSCH) transmission and a second PUSCH transmission that at least partially overlap in a time domain within a component carrier.

Some aspects described herein relate to a method of wireless communication performed by a network node. The method may include transmitting configuration information that indicates, for DCI having a first DCI format, a first SRS resource set associated with a first CORESET pool index value and a second SRS resource set associated with a second CORESET pool index value. The method may include transmitting DCI having a second DCI format that is configured only with a third SRS resource set associated with the first CORESET pool index value or is configured with both the third SRS resource set associated with the first CORESET pool index value and a fourth SRS resource set associated with the second CORESET pool index value. The method may include receiving, in accordance with at least one of the DCI having the first DCI format or the DCI having the second DCI format, a first PUSCH transmission and a second PUSCH transmission that at least partially overlap in a time domain within a component carrier.

Some aspects described herein relate to an apparatus for wireless communication at a UE. The apparatus may include a memory and one or more processors coupled to the memory. The one or more processors may be configured to obtain configuration information that indicates, for DCI having a first DCI format, a first SRS resource set associated with a first CORESET pool index value and a second SRS resource set associated with a second CORESET pool index value. The one or more processors may be configured to identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value. The one or more processors may be configured to selectively transmit, in accordance with at least one of the DCI having the first DCI format or the DCI having the second DCI format, a first PUSCH transmission and a second PUSCH transmission that at least partially overlap in a time domain within a component carrier.

Some aspects described herein relate to an apparatus for wireless communication at a network node. The apparatus may include a memory and one or more processors coupled to the memory. The one or more processors may be configured to transmit configuration information that indicates, for DCI having a first DCI format, a first SRS resource set associated with a first CORESET pool index value and a second SRS resource set associated with a second CORESET pool index value. The one or more processors may be configured to transmit DCI having a second DCI format that is configured only with a third SRS resource set associated with the first CORESET pool index value or is configured with both the third SRS resource set associated with the first CORESET pool index value and a fourth SRS resource set associated with the second CORESET pool index value. The one or more processors may be configured to receive, in accordance with at least one of the DCI having the first DCI format or the DCI having the second DCI format, a first PUSCH transmission and a second PUSCH transmission that at least partially overlap in a time domain within a component carrier.

Some aspects described herein relate to a non-transitory computer-readable medium that stores a set of instructions for wireless communication by a UE. The set of instructions, when executed by one or more processors of the UE, may cause the UE to obtain configuration information that indicates, for DCI having a first DCI format, a first SRS resource set associated with a first CORESET pool index value and a second SRS resource set associated with a second CORESET pool index value. The set of instructions, when executed by one or more processors of the UE, may cause the UE to identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value. The set of instructions, when executed by one or more processors of the UE, may cause the UE to selectively transmit, in accordance with at least one of the DCI having the first DCI format or the DCI having the second DCI format, a first PUSCH transmission and a second PUSCH transmission that at least partially overlap in a time domain within a component carrier.

Some aspects described herein relate to a non-transitory computer-readable medium that stores a set of instructions for wireless communication by a network node. The set of instructions, when executed by one or more processors of the network node, may cause the network node to transmit configuration information that indicates, for DCI having a first DCI format, a first SRS resource set associated with a first CORESET pool index value and a second SRS resource set associated with a second CORESET pool index value. The set of instructions, when executed by one or more processors of the network node, may cause the network node to transmit DCI having a second DCI format that is configured only with a third SRS resource set associated with the first CORESET pool index value or is configured with both the third SRS resource set associated with the first CORESET pool index value and a fourth SRS resource set associated with the second CORESET pool index value. The set of instructions, when executed by one or more processors of the network node, may cause the network node to receive, in accordance with at least one of the DCI having the first DCI format or the DCI having the second DCI format, a first PUSCH transmission and a second PUSCH transmission that at least partially overlap in a time domain within a component carrier.

Some aspects described herein relate to an apparatus for wireless communication. The apparatus may include means for obtaining configuration information that indicates, for DCI having a first DCI format, a first SRS resource set associated with a first CORESET pool index value and a second SRS resource set associated with a second CORESET pool index value. The apparatus may include means for identifying whether DCI having a second DCI format is configured only with a third SRS resource set associated with the first CORESET pool index value or is configured with both the third SRS resource set associated with the first CORESET pool index value and a fourth SRS resource set associated with the second CORESET pool index value. The apparatus may include means for selectively transmitting, in accordance with at least one of the DCI having the first DCI format or the DCI having the second DCI format, a first PUSCH transmission and a second PUSCH transmission that at least partially overlap in a time domain within a component carrier.

Some aspects described herein relate to an apparatus for wireless communication. The apparatus may include means for transmitting configuration information that indicates, for DCI having a first DCI format, a first SRS resource set associated with a first CORESET pool index value and a second SRS resource set associated with a second CORESET pool index value. The apparatus may include means for transmitting DCI having a second DCI format that is configured only with a third SRS resource set associated with the first CORESET pool index value or is configured with both the third SRS resource set associated with the first CORESET pool index value and a fourth SRS resource set associated with the second CORESET pool index value. The apparatus may include means for receiving, in accordance with at least one of the DCI having the first DCI format or the DCI having the second DCI format, a first PUSCH transmission and a second PUSCH transmission that at least partially overlap in a time domain within a component carrier.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Various aspects generally relate to sounding reference signal (SRS) resource set configuration. Some aspects more specifically relate to SRS resource set configuration for overlapping physical uplink shared channel (PUSCH) transmissions associated with different downlink control information (DCI) formats. In some examples, a user equipment (UE) may obtain configuration information that indicates, for a first DCI format, a first SRS resource set associated with a first control resource set (CORESET) pool index value and a second SRS resource set associated with a second CORESET pool index value. The UE may identify whether a second DCI format is configured with a third SRS resource set associated with the first CORESET pool index value or is configured with the third SRS resource set associated with the first CORESET pool index value and a fourth SRS resource set associated with the second CORESET pool index value. The UE may selectively transmit, in accordance with at least one of DCI having the first DCI format or DCI having the second DCI format, a first PUSCH transmission and a second PUSCH transmission that at least partially overlap in a time domain within a component carrier. In some examples, the second PUSCH transmission may be a Type 1 configured grant PUSCH transmission and may be configured with any of the first SRS resource set, the second SRS resource set, the third SRS resource set, or the fourth SRS resource set. In some other examples, the second PUSCH transmission may be a Type 1 configured grant PUSCH transmission and may be configured with the first SRS resource set or the second SRS resource set.

Particular aspects of the subject matter described in this disclosure can be implemented to realize one or more of the following potential advantages. In some examples, by identifying whether a DCI format is configured with a single SRS resource set or is configured with two SRS resource sets, the described techniques can be used to selectively transmit time domain overlapping PUSCH transmissions in a component carrier. A likelihood of interfering transmissions and/or dropped transmissions by the UE or the network node may be reduced.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term “cell” can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms “base station” or “network node” may refer to an aggregated base station, a disaggregated base station, an integrated access and backhaul (IAB) node, a relay node, or one or more components thereof. For example, in some aspects, “base station” or “network node” may refer to a CU, a DU, an RU, a Near-Real Time (Near-RT) RAN Intelligent Controller (RIC), or a Non-Real Time (Non-RT) RIC, or a combination thereof. In some aspects, the terms “base station” or “network node” may refer to one device configured to perform one or more functions, such as those described herein in connection with the network node 110. In some aspects, the terms “base station” or “network node” may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms “base station” or “network node” may refer to any one or more of those different devices. In some aspects, the terms “base station” or “network node” may refer to one or more virtual base stations or one or more virtual base station functions. For example, in some aspects, two or more base station functions may be instantiated on a single device. In some aspects, the terms “base station” or “network node” may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain configuration information that indicates, for DCI having a first DCI format, a first SRS resource set associated with a first CORESET pool index value and a second SRS resource set associated with a second CORESET pool index value; identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value; and selectively transmit, in accordance with at least one of the DCI having the first DCI format or the DCI having the second DCI format, a first PUSCH transmission and a second PUSCH transmission that at least partially overlap in a time domain within a component carrier. Additionally, or alternatively, the communication manager 140 may perform one or more other operations described herein.

In some aspects, the network node 110 may include a communication manager 150. As described in more detail elsewhere herein, the communication manager 150 may transmit configuration information that indicates, for DCI having a first DCI format, a first SRS resource set associated with a first CORESET pool index value and a second SRS resource set associated with a second CORESET pool index value; transmit DCI having a second DCI format that is configured only with a third SRS resource set associated with the first CORESET pool index value or is configured with both the third SRS resource set associated with the first CORESET pool index value and a fourth SRS resource set associated with the second CORESET pool index value; and receive, in accordance with at least one of the DCI having the first DCI format or the DCI having the second DCI format, a first PUSCH transmission and a second PUSCH transmission that at least partially overlap in a time domain within a component carrier. Additionally, or alternatively, the communication manager 150 may perform one or more other operations described herein.

As indicated above, FIG. 1 is provided as an example. Other examples may differ from what is described with regard to FIG. 1.

Figure 2:
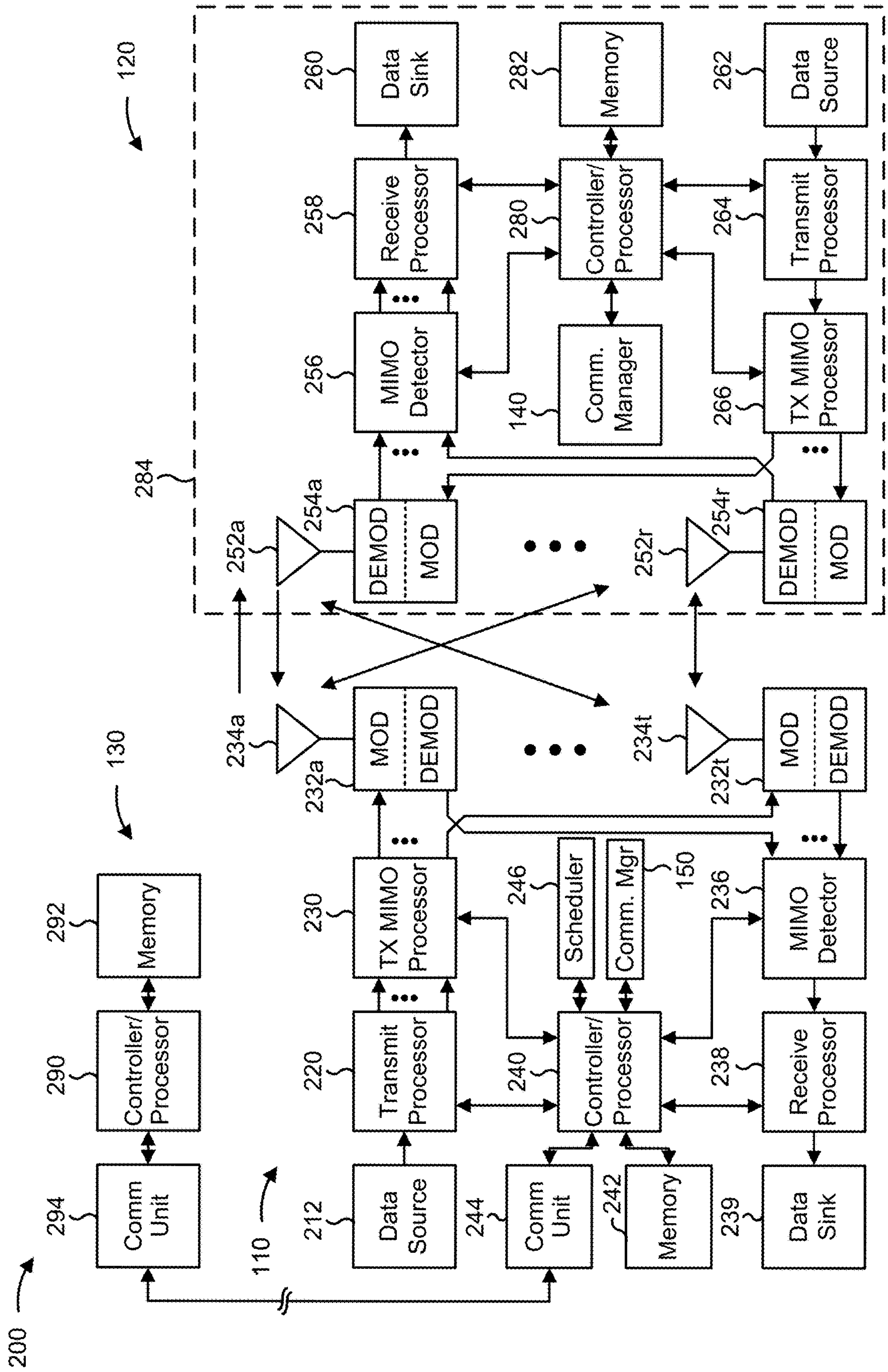
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the network node 110, the controller/processor 280 of the UE 120, and/or any other component(s) of FIG. 2 may perform one or more techniques associated with SRS resource set configuration, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for obtaining configuration information that indicates, for DCI having a first DCI format, a first SRS resource set associated with a first CORESET pool index value and a second SRS resource set associated with a second CORESET pool index value; means for identifying whether DCI having a second DCI format is configured only with a third SRS resource set associated with the first CORESET pool index value or is configured with both the third SRS resource set associated with the first CORESET pool index value and a fourth SRS resource set associated with the second CORESET pool index value; and/or means for selectively transmitting, in accordance with at least one of the DCI having the first DCI format or the DCI having the second DCI format, a first PUSCH transmission and a second PUSCH transmission that at least partially overlap in a time domain within a component carrier. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting configuration information that indicates, for DCI having a first DCI format, a first SRS resource set associated with a first CORESET pool index value and a second SRS resource set associated with a second CORESET pool index value; means for transmitting DCI having a second DCI format that is configured only with a third SRS resource set associated with the first CORESET pool index value or is configured with both the third SRS resource set associated with the first CORESET pool index value and a fourth SRS resource set associated with the second CORESET pool index value; and/or means for receiving, in accordance with at least one of the DCI having the first DCI format or the DCI having the second DCI format, a first PUSCH transmission and a second PUSCH transmission that at least partially overlap in a time domain within a component carrier. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
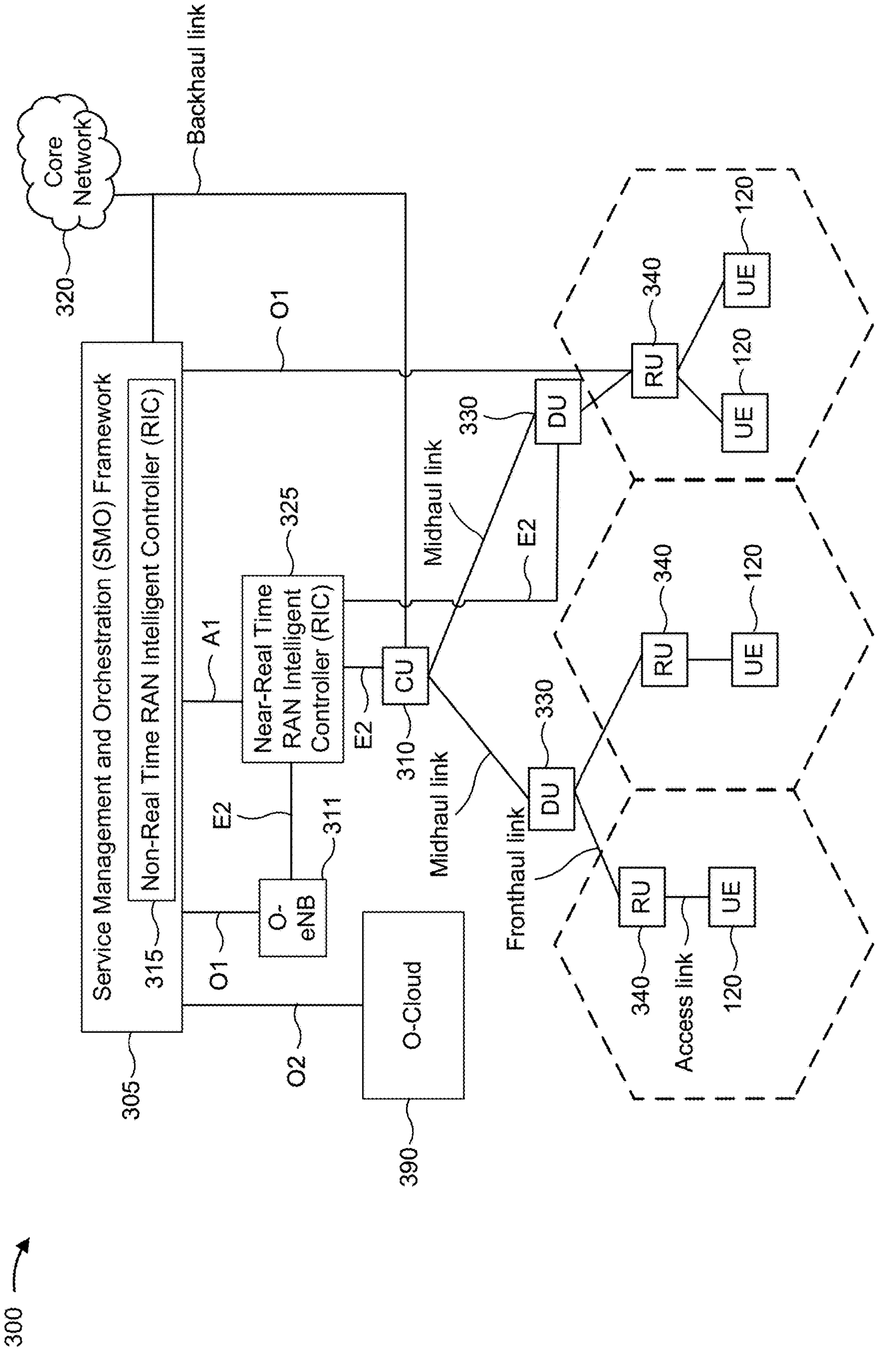
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
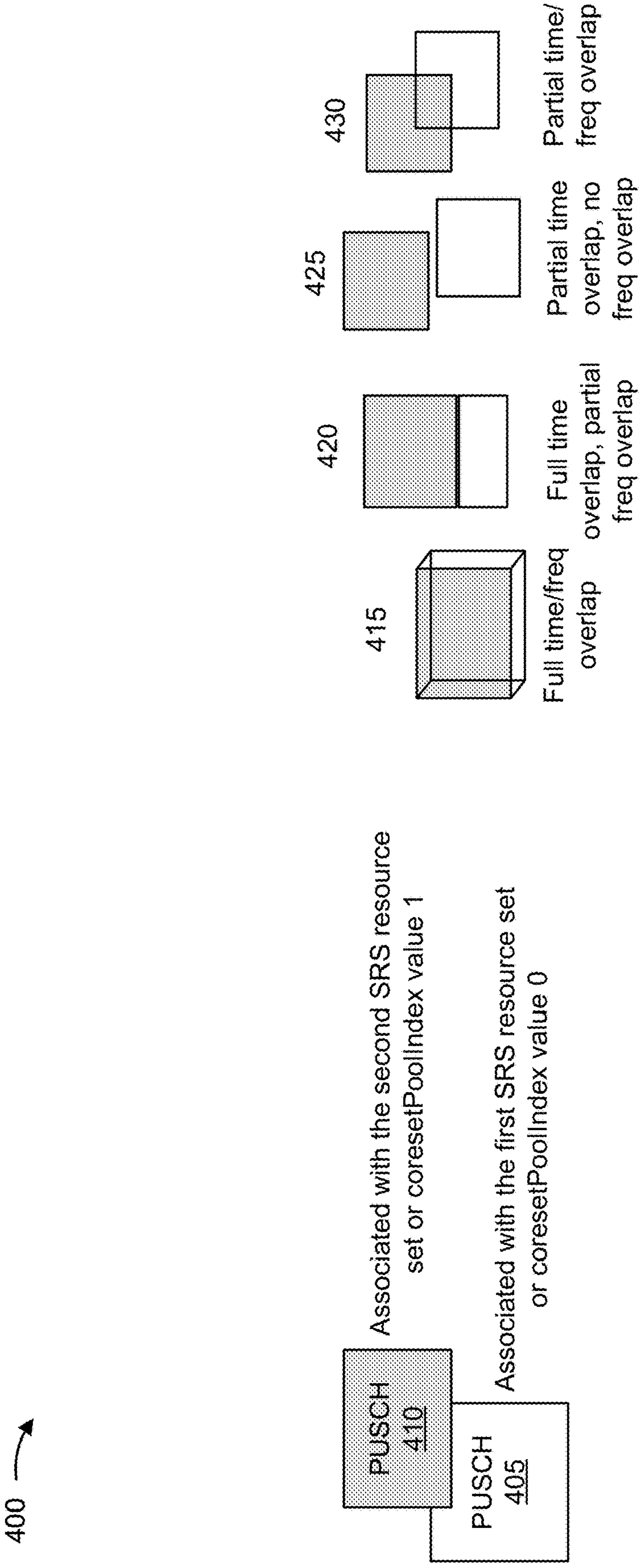
FIGS. 4A-4B are diagrams illustrating examples of physical uplink shared channel (PUSCH) resources and sounding reference signal transmissions, in accordance with the present disclosure.
Figure 4B:
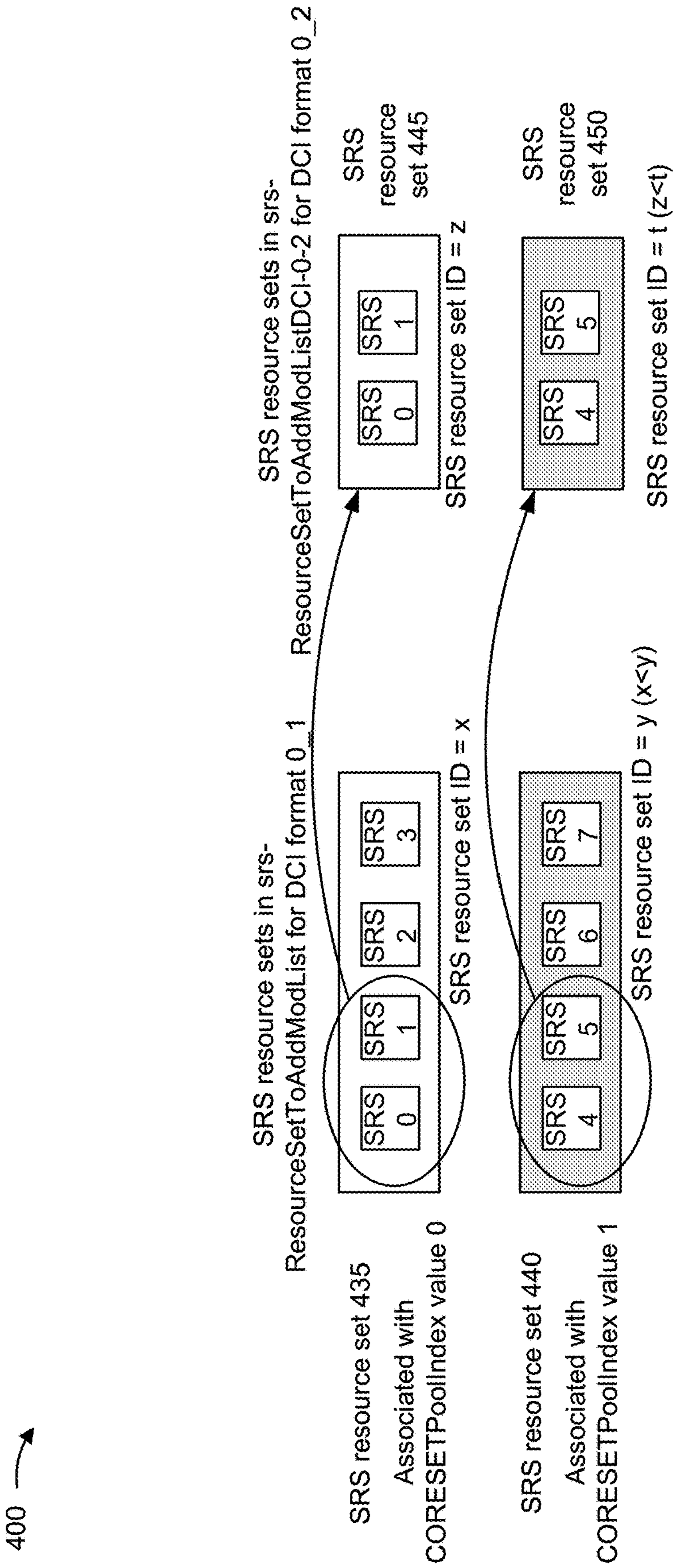

FIGS. 4A-4B are diagrams illustrating examples 400 of PUSCH resources and SRS transmissions, in accordance with the present disclosure.

In some cases, two or more types of PUSCH transmissions may be supported, such as codebook (CB)-based PUSCH transmissions and non-codebook (NCB)-based transmissions. For CB-based transmissions, the UE 120 may be configured with a single SRS resource set. The single SRS resource set may have a usage that is set to CB. A maximum of four SRS resources within the SRS resource set may be configured for the UE 120. Each SRS resource may be RRC configured with a number of SRS ports (nrofSRS-Ports). An SRS resource indicator (SRI) field in uplink DCI that schedules a PUSCH transmission may indicate a single SRS resource. A number of ports indicated for the SRS resource may determine a number of antenna ports to be used for the PUSCH transmission. The PUSCH transmission may be transmitted with a same spatial domain filter (e.g., uplink beam) as the indicated SRS resources. A number of layers (e.g., rank) and a transmitted precoding matrix indicator (TPMI) (precoder) for the scheduled PUSCH transmission may be determined from a separate DCI field associated with "precoding information and number of layers." For NCB-based transmissions, the UE 120 may be configured with a single SRS resource set. The single SRS resource set may have a usage that is set to NCB. A maximum of four SRS resources within the SRS resource set may be configured for the UE 120. Each SRS resource may be associated with a single port. An SRI field in the uplink DCI that schedules the PUSCH transmission may indicate one or more SRS resources. The number of indicated SRS resources may determine the rank (e.g., the number of layers) for the scheduled PUSCH transmission. The PUSCH may be transmitted with the same precoder and the same spatial domain filter (e.g., beam) as the indicated SRS resource. For both CB-based and NCB-based PUSCH transmissions, the size of the SRI field may be a function of the number of SRS resources within the SRS resource set.

The SRS resource set and SRI field in uplink DCI, for the CB-based and NCB-based PUSCH transmissions described above, may be used for DCI format 0_1. In some cases, DCI format 0_2 for scheduling PUSCH transmissions may be used. DCI format 0_2 may be used for DCI size reduction by decreasing the number of bits that are needed for each DCI field based at least in part on an RRC configuration. The SRS resource set (for CB-based and NCB-based PUSCH transmissions) may be separately configured for PUSCH transmissions scheduled by DCI format 0_2. For example, the RRC parameter srs-ResourceSetToAddModListDCI-0-2 may be used for DCI format 0_2, while the RRC parameter ResourceSetToAddModList may be used for DCI format 0_1. For CB-based PUSCH transmissions, a single SRS resource set with a usage set to CB may be configured within srs-ResourceSetToAddModListDCI-0-2. For NCB-based PUSCH transmissions, a single SRS resource set with a usage set to NCB can be configured within srs-ResourceSetToAddModListDCI-0-2. In some cases, a smaller number of SRS resources ($N_{SRS,\ 0\_2}$) within an SRS resource set may be configured, which may result in a smaller SRI bitwidth. However, the $N_{SRS,\ 0\_2}$ SRS resources within the SRS resource set for DCI format 0_2 may need to be the first $N_{SRS,\ 0\_2}$ SRS resource(s) within the SRS resource set for DCI format 0_1. This may ensure that UE complexity is not increased (for example, for DCI format 0_2 using a subset of SRS resources in the SRS resource set scheduled by DCI having DCI format 0_1).

In some cases, two different PUSCH resources in the same serving cell or component carrier may be partially or fully overlapped in a time domain and/or in a frequency domain. Two SRS resource sets (for CB or NCB) may be configured for the two different PUSCH resources. The overlap in the time domain and/or frequency domain may be enabled by a multi-DCI-based multi-TRP framework, and the two PUSCH resources may be associated with different CORESET pool index (CORESETPoolIndex) values. As shown in FIG. 4A, a first PUSCH resource 405 may be associated with a first SRS resource set and CORESET pool index value 0 and/or may be associated with a transmission using a first beam, a first transmission configuration indicator (TCI) state, a first power control parameter, or a first precoder. A second PUSCH resource 410 may be associated with a second SRS resource set and CORESET pool index value 1 and/or may be associated with a transmission using a second beam, a second TCI state, a second power control parameter, or a second precoder. As shown by reference number 415, the first PUSCH resource 405 and the second PUSCH resource 410 may fully overlap in the time domain and in the frequency domain. As shown by reference number 420, the first PUSCH resource 405 and the second PUSCH resource 410 may fully overlap in the time domain and may partially overlap in the frequency domain. As shown by reference number 425, the first PUSCH resource 405 and the second PUSCH resource 410 may partially overlap in the time domain but may not overlap in the frequency domain. As shown by reference number 430, the first PUSCH resource 405 and the second PUSCH resource 410 may partially overlap in the time domain and may partially overlap in the frequency domain.

In some cases, an SRS resource with a lower identifier (ID) may be associated with CORESET pool index value 0, and an SRS resource with a higher ID may be associated with CORESET pool index value 1. For dynamic grant (DG) PUSCH or Type 2 configured grant (CG) PUSCH, the SRI/TPMI field may be interpreted based at least in part on the corresponding SRS resource set, as described herein, and based at least in part on the CORESET in which the scheduling or activating DCI is received. For Type 1 CG PUSCH, the corresponding SRS resource set (e.g., the index or ID of the SRS resource set) may be RRC configured (e.g., since there is no DCI). In some cases, two PUSCH transmissions may occur simultaneously (overlapping in time) if they are associated with different SRS resource sets, or are associated with different CORESET pool index values in the case of DG or Type 2 CG.

In some cases, when separate SRS resource sets are scheduled by DCI having DCI format 0_2, there may be up to four SRS resource sets (either for CB or NCB) for multi-DCI-based PUSCH+PUSCH transmissions. An SRS resource set with a lower ID may be associated with CORESET pool index value 0, while an SRS resource set with a higher ID may be associated with CORESET pool index value 1. This rule may be separately applied for the two SRS resource sets configured by srs-ResourceSetToAddModList (for DCI format 0_1) and the two SRS resource sets configured by srs-ResourceSetToAddModListDCI-0-2 (for DCI format 0_2). The SRI/TPMI field in the DCI format 0_2 may be interpreted similarly. In some cases, the relationship between the SRS resource set for DCI format 0_1 and the SRS resource set for DCI format 0_2 may only be applicable for SRS resource sets associated with the same CORESET pool index value. As shown in FIG. 4B, for DCI format 0_1, an SRS resource set 435 may include SRS resource 0, SRS resource 1, SRS resource 2, and SRS resource 3 (shown as SRS 0, SRS 1, SRS 2, and SRS 3, respectively). The SRS resource set 435 may be associated with an SRS resource set ID x. An SRS resource set 440 may include SRS resource 4, SRS resource 5, SRS resource 6, and SRS resource 7 (shown as SRS 4, SRS 5, SRS 6, and SRS 7, respectively). The SRS resource set 440 may be associated with an SRS resource set ID y, where x<y. The SRS resource set 435 may be associated with CORESET pool index value 0 and the SRS resource set 440 may be associated with CORESET pool index value 1. For DCI format 0_2, an SRS resource set 445 may include SRS resource 0 and SRS resource 1. The SRS resource set 440 may be associated with an SRS resource ID z. An SRS resource set 450 may include SRS resource 4 and SRS resource 5. The SRS resource set 450 may be associated with an SRS resource ID t, where z<1. The SRS resource set 445 may be associated with CORESET pool index value 0 and the SRS resource set 450 may be associated with CORESET pool index value 1. SRS resource sets associated with DCI format 0_1 and SRS resource sets associated with DCI format 0_2 have a subset relationship for SRS resource sets associated with the same CORESETPoolIndex value. For example, as shown in FIG. 4B, SRS resource sets 435 and 445 are both associated with CORESETPoolIndex value 0, and SRS resource set 445 associated with DCI format 0_2 is a subset of SRS resource set 435 associated with DCI format 0_1. Similarly, SRS resource sets 440 and 450 are both associated with CORESETPoolIndex value 1, and SRS resource set 450 associated with DCI format 0_2 is a subset of SRS resource set 440 associated with DCI format 0_1.

In some cases, two SRS resource sets may be scheduled by DCI having a first DCI format and a single SRS resource set may be scheduled by DCI having a second DCI format. For example, two SRS resource sets may be scheduled by DCI having DCI format 0_1 and a single SRS resource set may be scheduled by DCI having DCI format 0_2. Alternatively, two SRS resource sets may be scheduled by DCI having DCI format 0_2 and a single SRS resource set may be scheduled by DCI having DCI format 0_1. In this case, a UE may not be able to determine an association between the single SRS resource set for the DCI format configured with the single SRS resource set and a CORESET pool index value. In some cases, the UE may not be able to determine whether time-domain overlapping PUSCH transmissions associated with the different DCI formats are possible. This may result in interfering transmissions and/or dropped transmissions by the UE or the network node.

Various aspects generally relate to SRS resource set configuration. Some aspects more specifically relate to SRS resource set configuration for overlapping PUSCH transmissions associated with different DCI formats. In some examples, a UE may obtain configuration information that indicates, for a first DCI format, a first SRS resource set associated with a first CORESET pool index value and a second SRS resource set associated with a second CORESET pool index value. The UE may identify whether a second DCI format is configured with a third SRS resource set associated with the first CORESET pool index value or is configured with the third SRS resource set associated with the first CORESET pool index value and a fourth SRS resource set associated with the second CORESET pool index value. The UE may selectively transmit, in accordance with at least one of DCI having the first DCI format or DCI having the second DCI format, a first PUSCH transmission and a second PUSCH transmission that at least partially overlap in a time domain within a component carrier. In some examples, the second PUSCH transmission may be a Type 1 configured grant PUSCH transmission and may be configured with any of the first SRS resource set, the second SRS resource set, the third SRS resource set, or the fourth SRS resource set. In some other examples, the second PUSCH transmission may be a Type 1 configured grant PUSCH transmission and may be configured with the first SRS resource set or the second SRS resource set.

Particular aspects of the subject matter described in this disclosure can be implemented to realize one or more of the following potential advantages. In some examples, by identifying whether a DCI format is configured with a single SRS resource set or is configured with two SRS resource sets, the described techniques can be used to selectively transmit time domain overlapping PUSCH transmissions in a component carrier. A likelihood of interfering transmissions and/or dropped transmissions by the UE or the network node may be reduced.

As indicated above, FIGS. 4A-4B are provided as examples. Other examples may differ from what is described with regard to FIGS. 4A-4B.

Figure 5:
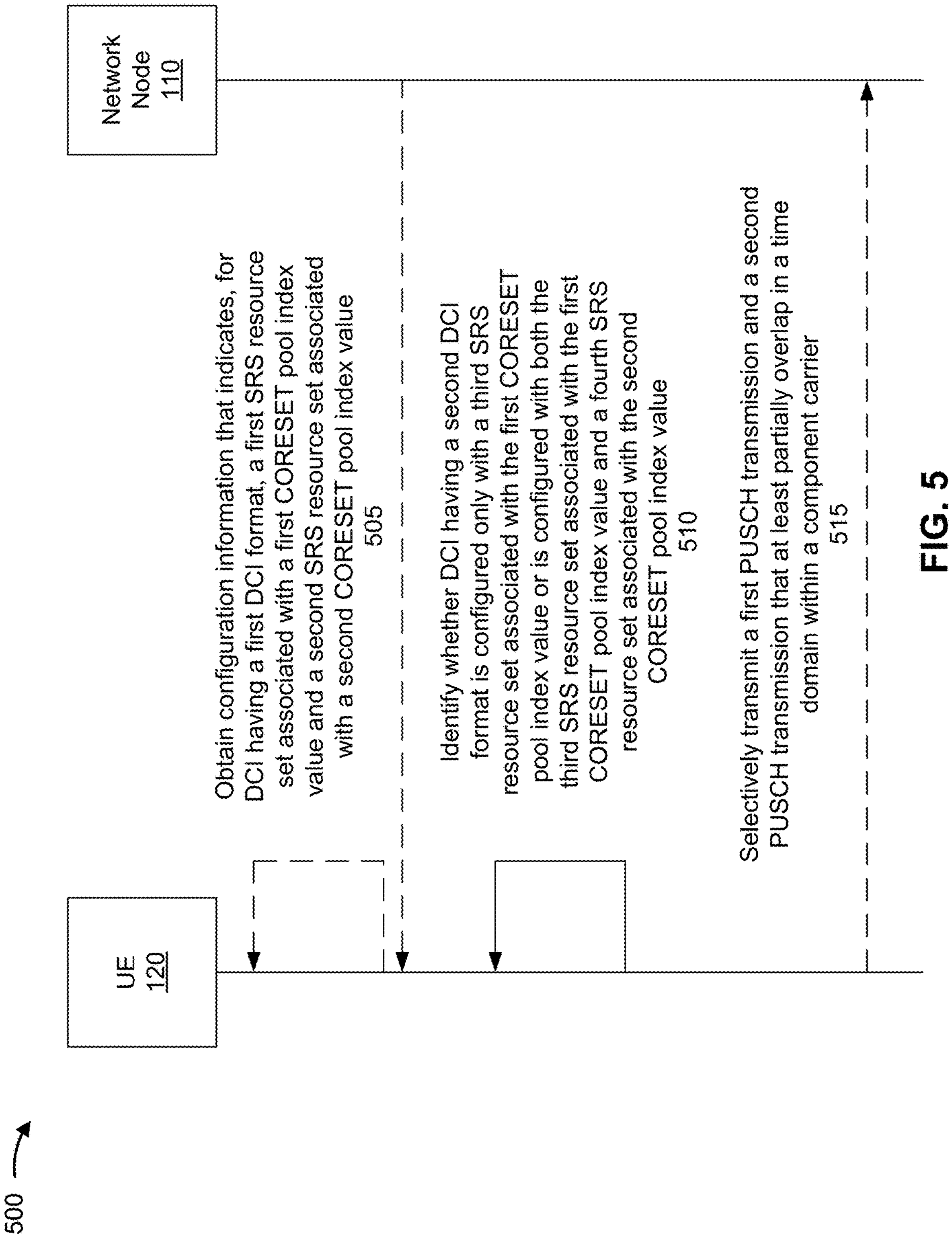
FIG. 5 is a diagram illustrating an example associated with a sounding reference signal resource set configuration, in accordance with the present disclosure.

FIG. 5 is a diagram illustrating an example 500 associated with an SRS resource set configuration, in accordance with the present disclosure.

As shown by reference number 505, the UE 120 may obtain configuration information that indicates, for DCI having a first DCI format, a first SRS resource set associated with a first CORESET pool index value and a second SRS resource set associated with a second CORESET pool index value. In some aspects, the network node 110 may transmit, and the UE 120 may receive, the configuration information. Additionally, or alternatively, the UE 120 may be (pre-) configured with the configuration information. The first CORESET pool index value may be a CORESET pool index value 0 and the second CORESET pool index value may be a CORESET pool index value 1.

In some aspects, the UE 120 may be configured with the two CORESET pool index values (e.g., CORESET pool index value 0 and CORESET pool index value 1) in a component carrier (e.g., for multi-DCI-based multi-TRP) for PUSCH transmissions that at least partially overlap in a time domain within the component carrier. The UE 120 may be configured with the two SRS resource sets (e.g., the first SRS resource set and the second SRS resource set) associated, respectively, with the two CORESET pool index values for CB-based and/or NCB-based PUSCH transmissions associated with the DCI having the first DCI format. In some aspects, the first DCI format may be a DCI format 0_1. In this case, the first SRS resource set and the second SRS resource set may be configured in srs-ResourceSet-ToAddModList. In some other aspects, the first DCI format may be a DCI format 0_2. In this case, the first SRS resource set and the second SRS resource set may be configured in srs-ResourceSetToAddModListDCI-0-2. In some aspects, the association between the two SRS resource sets and the two CORESET pool index values may be based at least in part on an identifier value associated with the SRS resource sets. For example, the first SRS resource set may be associated with the first CORESET pool index value based at least in part on the first SRS resource set having an identifier with a value (x) that is lower than a value (y) of an identifier associated with the second SRS resource set (e.g., x<y).

As shown by reference number 510, the UE 120 may identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value. As described in connection with FIG. 4, in one example, the DCI having the second DCI format may be configured only with SRS resource set z associated with the CORESET pool index value 0. In another example, the DCI having the second DCI format may be configured with SRS resource set z associated with the CORESET pool index value 0 and with SRS resource set t associated with the CORESET pool index value 1. The UE 120 may monitor for the DCI having the second DCI format for PUSCH scheduling. In some aspects, the first DCI format may be a DCI format 0_1 and the second DCI format may be a DCI format 0_2. In some other aspects, the first DCI format may be a DCI format 0_2 and the second DCI format may be a DCI format 0_1.

As shown by reference number 515, the UE 120 may transmit, and the network node 110 may receive, a first PUSCH transmission and a second PUSCH transmission that at least partially overlap in the time domain within the component carrier. The first PUSCH transmission and the second PUSCH transmission may be based at least in part on DCI having the first DCI format and/or DCI having the second DCI format.

In a first example, the UE 120 may identify that two SRS resource sets are scheduled by DCI having the second DCI format. For example, the UE 120 may identify that the DCI having the second DCI format is configured with the third SRS resource set associated with the first CORESET pool index value and the fourth SRS resource set associated with the second CORESET pool index value.

In some aspects, an SRS resource set for a Type 1 configured grant PUSCH transmission may be any of the first SRS resource set, the second SRS resource set, the third SRS resource set, or the fourth SRS resource set. In some other aspects, the SRS resource set for the Type 1 configured grant PUSCH transmission may be the first SRS resource set or the second SRS resource set (e.g., may be any of the SRS resource sets configured in srs-ResourceSetToAddModList for DCI format 0_1).

In some aspects, the first PUSCH transmission and the second PUSCH transmission may be transmitted simultaneously (e.g., at least partially overlapping in the time domain) in the same component carrier based at least in part on the first PUSCH transmission and the second PUSCH transmission being associated with different SRS resource sets and based at least in part on one of the SRS resource sets not being a subset of the other SRS resource set. In the example above, if the first PUSCH transmission and the second PUSCH transmission are associated with SRS resource set ID x and SRS resource set ID y, with SRS resource set ID z and SRS resource set ID t, with SRS resource set ID x and SRS resource set ID t, or with SRS resource set ID z and SRS resource set ID y, the first PUSCH transmission and the second PUSCH transmission may be transmitted simultaneously. Alternatively, if the first PUSCH transmission and the second PUSCH transmission are associated with SRS resource set ID x and SRS resource set ID z, or with SRS resource set ID y and SRS resource set ID 1, the first PUSCH transmission and the second PUSCH transmission may not be transmitted simultaneously. Additional details regarding these features are described in connection with FIG. 6. In some aspects, if one SRS resource set is a subset of the other SRS resource set (e.g., in the case of SRS resource set ID x and SRS resource set ID z, or SRS resource set ID y and SRS resource set ID t), the PUSCH transmissions may be transmitted from the same panel (e.g., with the same power control parameters and using the same beam), but for simultaneous PUSCH transmissions, the UE 120 may need to use different panels. In some aspects, this condition may be ensured automatically for two PUSCH transmissions corresponding, respectively, to a DG transmission and a DG transmission, a DG transmission and a Type 2 CG transmission, or a Type 2 CG transmission and a Type 2 CG transmission, where the two PUSCH transmissions are associated with different CORESET pool index values (given that for each DCI format, the CORESET pool index of the CORESET in which the DCI is received determines the associated SRS resource set). However, this condition may need to be imposed for two PUSCH transmissions corresponding, respectively, to a DG transmission and a Type 1 CG transmission, or a Type 2 CG transmission and a Type 1 CG transmission.

In a second example, the UE 120 may identify that a single SRS resource set is scheduled by DCI having the second DCI format. For example, the UE 120 May identify that the DCI having the second DCI format is configured with the third SRS resource set associated with the first CORESET pool index value (CORESET pool index value 0). If the second DCI format is DCI format 0_2, the SRS resource set may be configured in srs-ResourceSetToAddModListDCI-0-2. Alternatively, if the second DCI format is DCI format 0_1, the SRS resource set may be configured in srs-ResourceSetToAddModList.

In some aspects, the UE 120 may determine that the UE 120 is not to receive DCI having the second DCI format in a CORESET that is associated with the second CORESET pool index value (CORESET pool index value 1). For example, the DCI having the second DCI format can be only received in CORESETs associated with CORESET pool index value 0. In some aspects, if the UE 120 is scheduled to transmit the first PUSCH transmission by DCI having the second DCI format in a CORESET that is associated with the second CORESET pool index value (CORESET pool index value 1), the UE 120 may determine that the UE 120 is not to be scheduled to transmit the second PUSCH transmission that at least partially overlaps with the first PUSCH transmission. Simultaneous PUSCH transmissions may not be permitted if one of the PUSCH transmissions is scheduled by DCI having the second DCI format that is associated with the second CORESET pool index value. In some aspects, if the UE 120 is scheduled to transmit the first PUSCH transmission by DCI having the second DCI format in a CORESET that is associated with the second CORESET pool index value (CORESET pool index value 1), the UE 120 may be scheduled to transmit the second PUSCH transmission that at least partially overlaps with the first PUSCH transmission only if the UE 120 is scheduled by DCI having the first DCI format in a CORESET that is associated with the second CORESET pool index value. In this case, the condition for simultaneous PUSCH transmissions may not be based on the association with the different CORESET pool index value. Additional details regarding these features are described in connection with FIG. 7.

In some aspects, an SRS resource set for a Type 1 configured grant PUSCH transmission may be any of the first SRS resource set, the second SRS resource set, or the third SRS resource set. In some other aspects, the SRS resource set for the Type 1 configured grant PUSCH transmission may be the first SRS resource set or the second SRS resource set (e.g., may be any of the SRS resource sets configured in srs-ResourceSetToAddModList for DCI format 0_1).

In some aspects, the first PUSCH transmission and the second PUSCH transmission may be transmitted simultaneously (e.g., at least partially overlapping in the time domain) in the same component carrier based at least in part on the first PUSCH transmission and the second PUSCH transmission being associated with different SRS resource sets and based at least in part on one of the SRS resource sets not being a subset of the other SRS resource set. In the example above, if the first PUSCH transmission and the second PUSCH transmission are associated with SRS resource set ID x and SRS resource set ID y, or with SRS resource set ID z and SRS resource set ID y, the first PUSCH transmission and the second PUSCH transmission may be transmitted simultaneously. Alternatively, if the first PUSCH transmission and the second PUSCH transmission are associated with SRS resource set ID x and SRS resource set ID z, the first PUSCH transmission and the second PUSCH transmission may not be transmitted simultaneously. This condition may be needed for simultaneous DG and DG transmissions, DG and Type 2 CG transmissions, Type 2 CG and Type 2 CG transmissions, DG and Type 1 CG transmissions, and Type 2 CG and Type 1 CG transmissions. If a DG or Type 2 CG transmission is scheduled by DCI having the second DCI format in a CORESET associated with the second CORESET pool index value, the DG or Type 2 CG transmission may overlap with a Type 1 CG transmission if the above condition is satisfied. Additional details regarding these features are described in connection with FIG. 8.

As indicated above, FIG. 5 is provided as an example. Other examples may differ from what is described with regard to FIG. 5.

Figure 6:
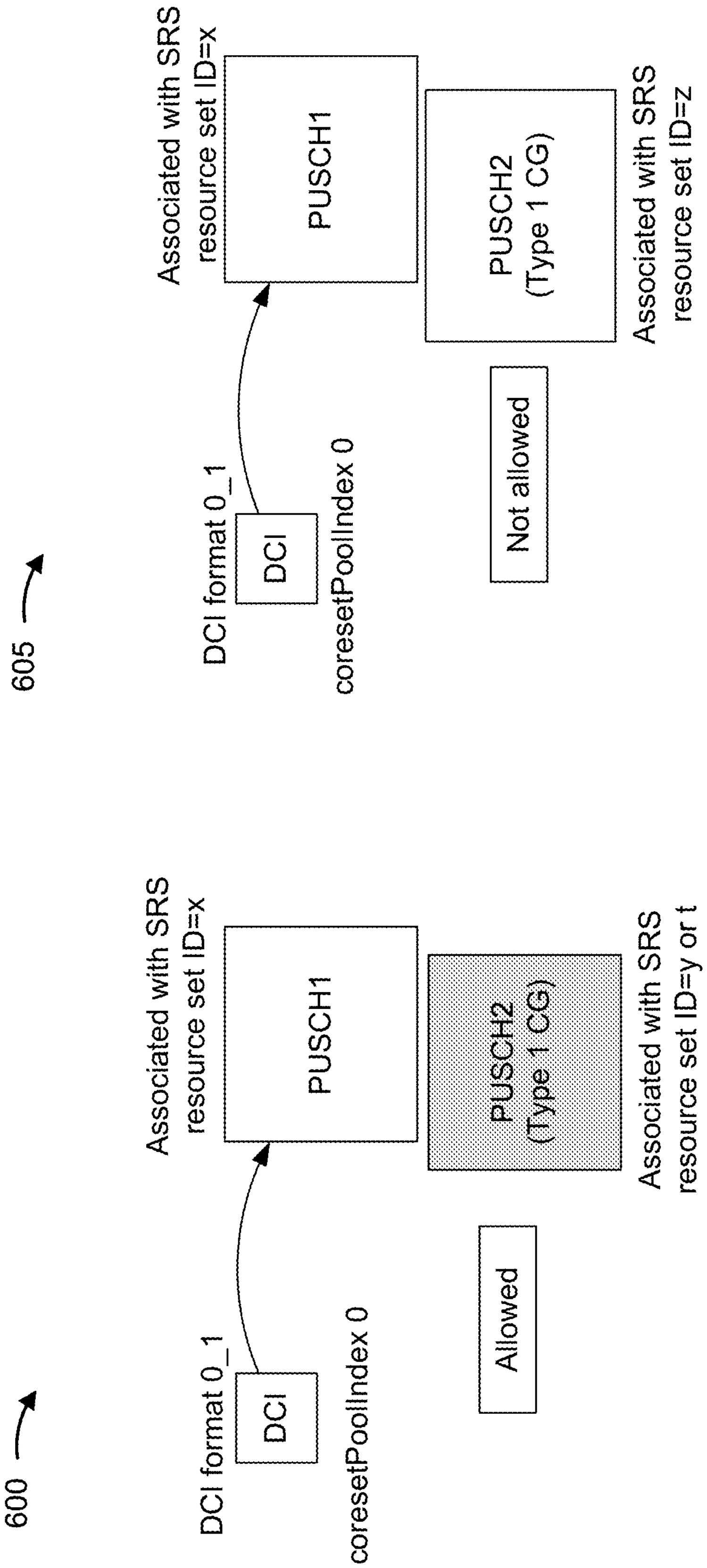
FIG. 6 is a diagram illustrating examples of time domain overlapping PUSCH transmissions, in accordance with the present disclosure.

FIG. 6 is a diagram illustrating examples 600 and 605 of time domain overlapping PUSCH transmissions, in accordance with the present disclosure. A first SRS resource set associated with SRS resource set ID x may be scheduled by DCI having DCI format 0_1 and may be associated with a first CORESET pool index value (CORESET pool index value 0), and a second SRS resource set associated with SRS resource set ID y may be scheduled by DCI having DCI format 0_1 and may be associated with a second CORESET pool index value (CORESET pool index value 1), where $x<y$. A third SRS resource set associated with SRS resource ID z may be scheduled by DCI having DCI format 0_1 and may be associated with the first CORESET pool index value, and a fourth SRS resource associated with SRS resource ID t may be scheduled by DCI having DCI format 0_1 and may be associated with the second CORESET pool index value, where $z<1$. As shown in the example 600, PUSCH1 and PUSCH2 may be transmitted simultaneously (e.g., at least partially overlapping in the time domain) based at least in part on PUSCH1 being associated with SRS resource ID x and based at least in part on PUSCH2 being a Type 1 CG transmission that is associated with SRS resource ID y or t. Alternatively, PUSCH1 and PUSCH2 may not be transmitted simultaneously based at least in part on PUSCH1 being associated with SRS resource ID x and based at least in part on PUSCH2 being associated with SRS resource set ID z.

As indicated above, FIG. 6 is provided as an example. Other examples may differ from what is described with regard to FIG. 6.

Figure 7:
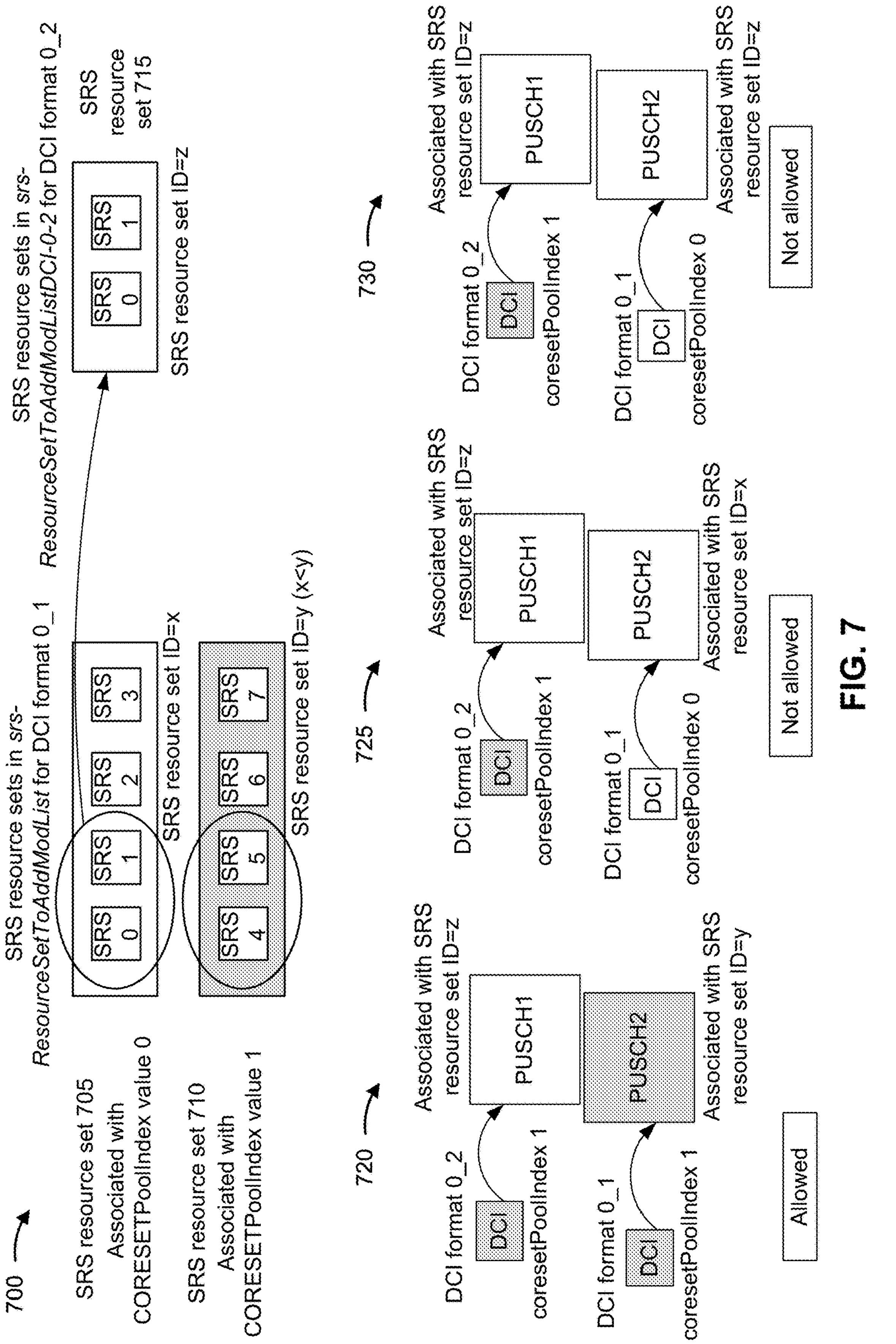
FIG. 7 is a diagram illustrating examples of time domain overlapping PUSCH transmissions, in accordance with the present disclosure.

FIG. 7 is a diagram illustrating examples 700 of time domain overlapping PUSCH transmissions, in accordance with the present disclosure. A first SRS resource set 705 associated with SRS resource set ID x may be scheduled by DCI having DCI format 0_1 and may be associated with a first CORESET pool index value (CORESET pool index value 0), and a second SRS resource set 710 associated with SRS resource set ID y may be scheduled by DCI having DCI format 0_1 and may be associated with a second CORESET pool index value (CORESET pool index value 1), where x<y. A third SRS resource set 715 associated with SRS resource ID z may be scheduled by DCI having DCI format 0_2 and may be associated with the first CORESET pool index value. As shown in the example 720, DCI having DCI format 0_2 and associated with the second CORESET pool index value may schedule PUSCH1 associated with SRS resource set ID z, and DCI having DCI format 0_1 and associated with the second CORESET pool index value may schedule PUSCH2 associated with SRS resource ID y. In this case, PUSCH1 and PUSCH2 may be transmitted simultaneously, for example, since the SRS resource set for PUSCH1 and the SRS resource set for PUSCH2 are associated with different CORESET pool index values. As shown in the example 725, DCI having DCI format 0_2 and associated with the second CORESET pool index value may schedule PUSCH1 associated with SRS resource set ID z, and DCI having DCI format 0_1 and associated with the first CORESET pool index value may schedule PUSCH2 associated with SRS resource ID x. In this case, PUSCH1 and PUSCH2 may not be transmitted simultaneously, for example, since the SRS resource set for PUSCH1 and the SRS resource set for PUSCH2 are associated with the same CORESET pool index value and the SRS resource set for PUSCH2 is a subset of the SRS resource set for PUSCH1. As shown in the example 730, DCI having DCI format 0_2 and associated with the second CORESET pool index value may schedule PUSCH1 associated with SRS resource set ID z, and DCI having DCI format 0_1 and associated with the first CORESET pool index value may schedule PUSCH2 associated with SRS resource ID z. In this case, PUSCH1 and PUSCH2 may not be transmitted simultaneously, for example, since PUSCH1 and PUSCH2 are associated with the same SRS resource set and the same CORESET pool index value.

As indicated above, FIG. 7 is provided as an example. Other examples may differ from what is described with regard to FIG. 7.

Figure 8:
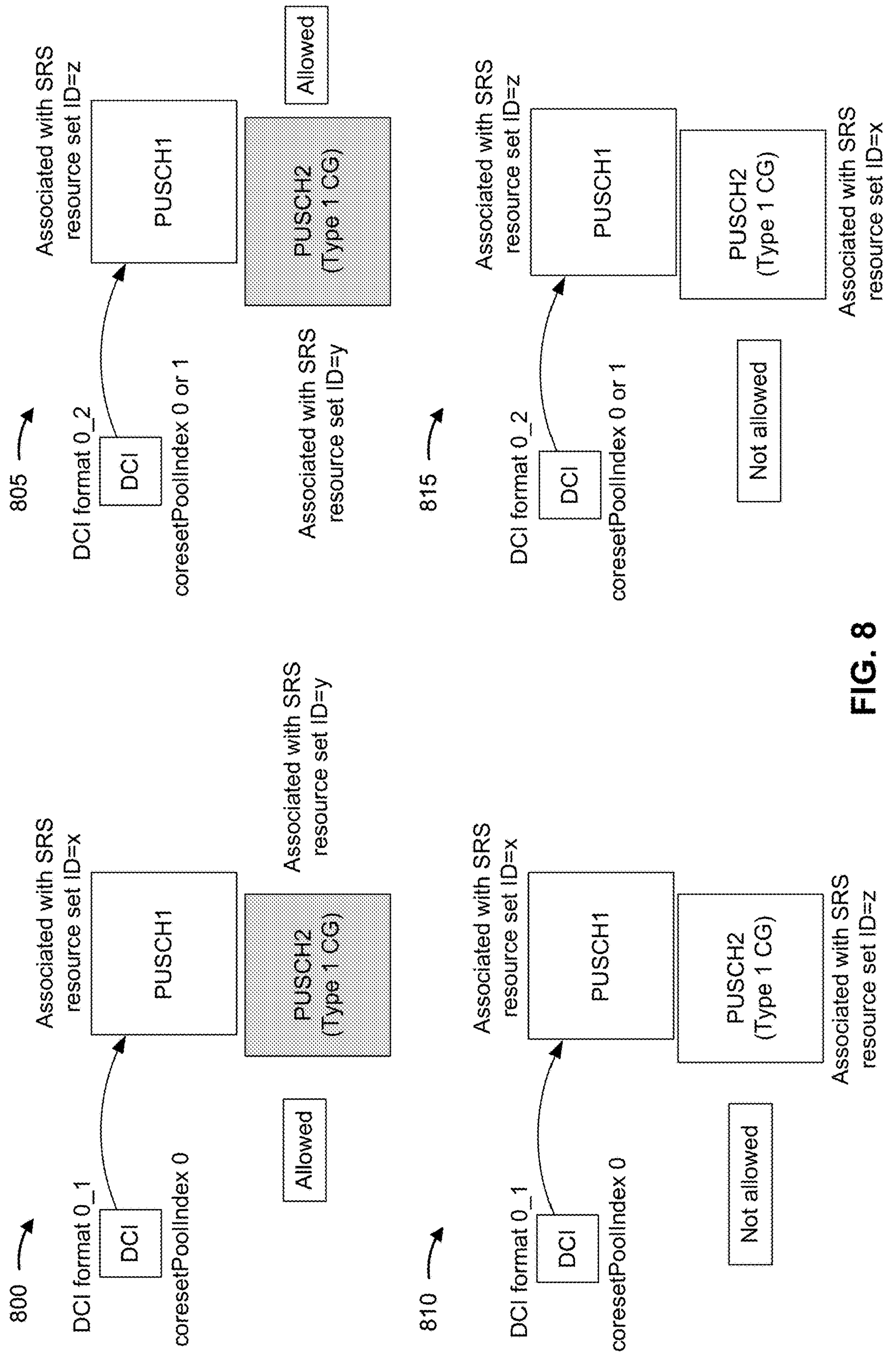
FIG. 8 is a diagram illustrating examples of time domain overlapping PUSCH transmissions, in accordance with the present disclosure.

FIG. 8 is a diagram illustrating examples 800, 805, 810, and 815 of time domain overlapping PUSCH transmissions, in accordance with the present disclosure. As shown in the example 800, DCI having DCI format 0_1 and associated with a first CORESET pool index value (CORESET pool index value 0) may schedule PUSCH1 associated with SRS resource ID x and the first CORESET pool index value. Simultaneous transmission of PUSCH2 (Type 1 CG) associated with SRS resource ID y and a second CORESET pool index value (CORESET pool index value 1) may be permitted, for example, since the SRS resource set for PUSCH1 and the SRS resource set for PUSCH2 are associated with different CORESET pool index values. As shown in the example 805, DCI having DCI format 0_2 and associated with the first CORESET pool index value or the second CORESET pool index value may schedule PUSCH1 associated with SRS resource ID z and the first CORESET pool index value. Simultaneous transmission of PUSCH2 (Type 1 CG) associated with SRS resource ID y and the second CORESET pool index value may be permitted, for example, since the SRS resource set for PUSCH1 and the SRS resource set for PUSCH2 are associated with different CORESET pool index values. As shown in the example 810, DCI having DCI format 0_1 and associated with the first CORESET pool index value may schedule PUSCH1 associated with SRS resource ID x and the first CORESET pool index value. Simultaneous transmission of PUSCH2 (Type 1 CG) associated with SRS resource ID z and the first CORESET pool index value may not be permitted, for example, since the SRS resource set for PUSCH1 and the SRS resource set for PUSCH2 are associated with the same CORESET pool index value and the SRS resource set for PUSCH2 is a subset of the SRS resource set for PUSCH1. As shown in the example 815, DCI having DCI format 0_2 and associated with the first CORESET pool index value or the second CORESET pool index value may schedule PUSCH1 associated with SRS resource ID z and the first CORESET pool index value. Simultaneous transmission of PUSCH2 (Type 1 CG) associated with SRS resource ID x and the first CORESET pool index value may not be permitted, for example, since the SRS resource set for PUSCH1 and the SRS resource set for PUSCH2 are associated with the same CORESET pool index value and the SRS resource set for PUSCH2 is a subset of the SRS resource set for PUSCH1.

As indicated above, FIG. 8 is provided as an example. Other examples may differ from what is described with regard to FIG. 8.

Figure 9:
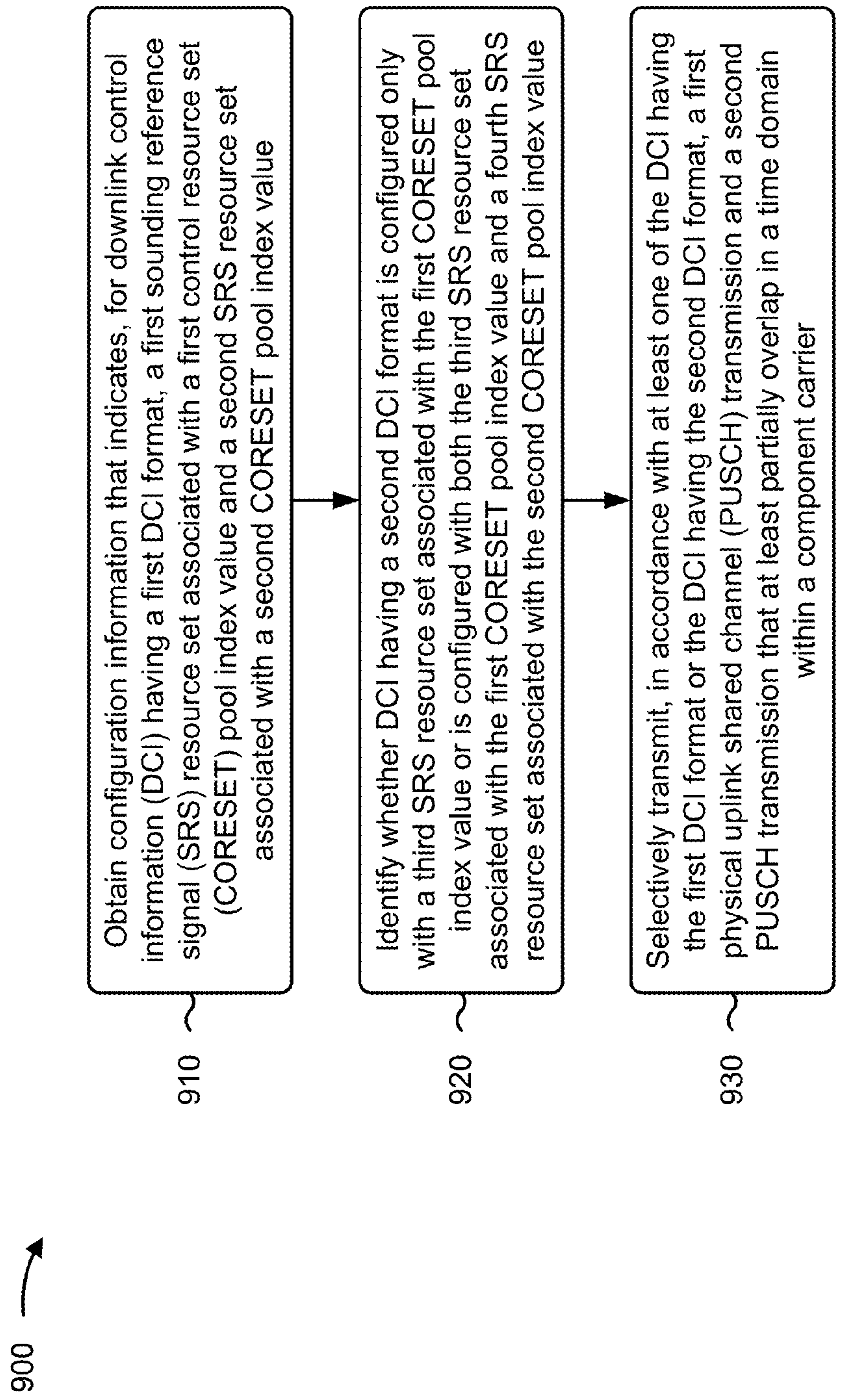
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with SRS resource set configuration.

As shown in FIG. 9, in some aspects, process 900 may include obtaining configuration information that indicates, for DCI having a first DCI format, a first SRS resource set associated with a first CORESET pool index value and a second SRS resource set associated with a second CORESET pool index value (block 910). For example, the UE (e.g., using reception component 1102 and/or communication manager 1106, depicted in FIG. 11) may obtain configuration information that indicates, for DCI having a first DCI format, a first SRS resource set associated with a first CORESET pool index value and a second SRS resource set associated with a second CORESET pool index value, as described above.

As further shown in FIG. 9, in some aspects, process 900 may include identifying whether DCI having a second DCI format is configured only with a third SRS resource set associated with the first CORESET pool index value or is configured with both the third SRS resource set associated with the first CORESET pool index value and a fourth SRS resource set associated with the second CORESET pool index value (block 920). For example, the UE (e.g., using communication manager 1106, depicted in FIG. 11) may identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value, as described above.

As further shown in FIG. 9, in some aspects, process 900 may include selectively transmitting, in accordance with at least one of the DCI having the first DCI format or the DCI having the second DCI format, a first PUSCH transmission and a second PUSCH transmission that at least partially overlap in a time domain within a component carrier (block 930). For example, the UE (e.g., using transmission component 1104 and/or communication manager 1106, depicted in FIG. 11) may selectively transmit, in accordance with at least one of the DCI having the first DCI format or the DCI having the second DCI format, a first PUSCH transmission and a second PUSCH transmission that at least partially overlap in a time domain within a component carrier, as described above.

Process 900 may include additional aspects, such as any single aspect or any combination of aspects described below and/or in connection with one or more other processes described elsewhere herein.

In a first aspect, the first DCI format is a DCI format 0_1 or a DCI format 0_2, and the second DCI format is the other of the DCI format 0_1 or the DCI format 0_2.

In a second aspect, alone or in combination with the first aspect, identifying whether the DCI having the second DCI format is configured with the third SRS resource set or is configured with both the third SRS resource set and the fourth SRS resource set comprises identifying that the DCI having the second DCI format is configured with both the third SRS resource set and the fourth SRS resource set.

In a third aspect, alone or in combination with one or more of the first and second aspects, the second PUSCH transmission is a Type 1 configured grant PUSCH transmission and is configured with any of the first SRS resource set, the second SRS resource set, the third SRS resource set, or the fourth SRS resource set.

In a fourth aspect, alone or in combination with one or more of the first through third aspects, the second PUSCH transmission is a Type 1 configured grant PUSCH transmission and is configured with the first SRS resource set or the second SRS resource set.

In a fifth aspect, alone or in combination with one or more of the first through fourth aspects, selectively transmitting the first PUSCH transmission and the second PUSCH transmission that at least partially overlap in the time domain within the component carrier comprises transmitting the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

In a sixth aspect, alone or in combination with one or more of the first through fifth aspects, identifying whether the DCI having the second DCI format is configured with the third SRS resource set or is configured with both the third SRS resource set and the fourth SRS resource set comprises identifying that the DCI having the second DCI format is configured only with the third SRS resource set.

In a seventh aspect, alone or in combination with one or more of the first through sixth aspects, process 900 includes determining that the UE is not to receive the DCI having the second DCI format in a CORESET that is associated with the second CORESET pool index value.

In an eighth aspect, alone or in combination with one or more of the first through seventh aspects, the DCI having the second DCI format is only to be received in a CORESET that is associated with the first CORESET pool index value.

In a ninth aspect, alone or in combination with one or more of the first through eighth aspects, process 900 includes determining to refrain from transmitting the second PUSCH transmission that at least partially overlaps with the first PUSCH transmission based at least in part on the first PUSCH transmission being associated with the DCI having the second DCI format in a CORESET that is associated with the second CORESET pool index value.

In a tenth aspect, alone or in combination with one or more of the first through ninth aspects, selectively transmitting the first PUSCH transmission and the second PUSCH transmission that at least partially overlap in the time domain within the component carrier comprises refraining from transmitting the second PUSCH transmission based at least in part on the first PUSCH transmission being associated with the DCI having the second DCI format in the CORESET that is associated with the second CORESET pool index value.

In an eleventh aspect, alone or in combination with one or more of the first through tenth aspects, process 900 includes determining to transmit the second PUSCH transmission based at least in part on the second PUSCH transmission being scheduled by the DCI having the first DCI format in a CORESET that is associated with the second CORESET pool index value and based at least in part on the UE being scheduled to transmit the first PUSCH transmission by the DCI having the second DCI format in a CORESET that is associated with the second CORESET pool index value.

In a twelfth aspect, alone or in combination with one or more of the first through eleventh aspects, selectively transmitting the first PUSCH transmission and the second PUSCH transmission that at least partially overlap in the time domain within the component carrier comprises transmitting the second PUSCH transmission based at least in part on the second PUSCH transmission being scheduled by the DCI having the first DCI format in the CORESET that is associated with the second CORESET pool index value and based at least in part on the UE being scheduled to transmit the first PUSCH transmission by the DCI having the second DCI format in the CORESET that is associated with the second CORESET pool index value.

In a thirteenth aspect, alone or in combination with one or more of the first through twelfth aspects, the second PUSCH transmission is a Type 1 configured grant PUSCH transmission and is configured with any of the first SRS resource set, the second SRS resource set, or the third SRS resource set.

In a fourteenth aspect, alone or in combination with one or more of the first through thirteenth aspects, the second PUSCH transmission is a Type 1 configured grant PUSCH transmission and is configured with the first SRS resource set or the second SRS resource set.

In a fifteenth aspect, alone or in combination with one or more of the first through fourteenth aspects, selectively transmitting the first PUSCH transmission and the second PUSCH transmission that at least partially overlap in the time domain within the component carrier comprises transmitting the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

In a sixteenth aspect, alone or in combination with one or more of the first through fifteenth aspects, the configuration information that indicates the first SRS resource set associated with the first CORESET pool index value and the second SRS resource set associated with the second CORESET pool index value includes configuration information for codebook-based and non-codebook-based PUSCH transmissions.

In a seventeenth aspect, alone or in combination with one or more of the first through sixteenth aspects, the first SRS resource set is associated with the first CORESET pool index value based at least in part on the first SRS resource set having an identifier with a value that is lower than a value of an identifier associated with the second SRS resource set, and the second SRS resource set is associated with the second CORESET pool index value based at least in part on the second SRS resource set having the identifier with the value that is greater than the value of the identifier associated with the first SRS resource set.

In an eighteenth aspect, alone or in combination with one or more of the first through seventeenth aspects, the first CORESET pool index value is a CORESET pool index value 0 and the second CORESET pool index value is a CORESET pool index value 1.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
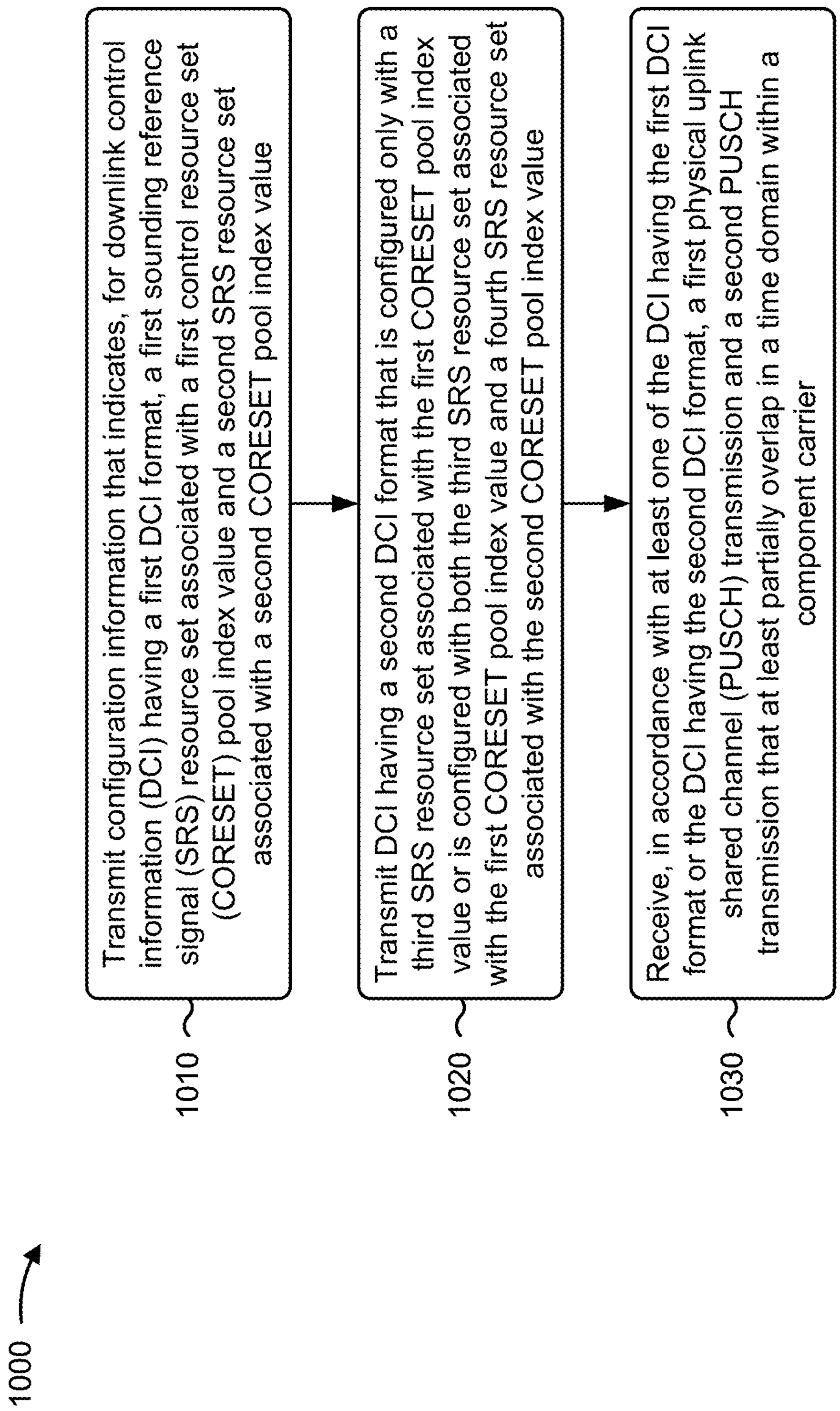
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with SRS resource set configuration.

As shown in FIG. 10, in some aspects, process 1000 may include transmitting configuration information that indicates, for DCI having a first DCI format, a first SRS resource set associated with a first CORESET pool index value and a second SRS resource set associated with a second CORESET pool index value (block 1010). For example, the network node (e.g., using transmission component 1204 and/or communication manager 1206, depicted in FIG. 12) may transmit configuration information that indicates, for DCI having a first DCI format, a first SRS resource set associated with a first CORESET pool index value and a second SRS resource set associated with a second CORESET pool index value, as described above.

As further shown in FIG. 10, in some aspects, process 1000 may include transmitting DCI having a second DCI format that is configured only with a third SRS resource set associated with the first CORESET pool index value or is configured with both the third SRS resource set associated with the first CORESET pool index value and a fourth SRS resource set associated with the second CORESET pool index value (block 1020). For example, the network node (e.g., using transmission component 1204 and/or communication manager 1206, depicted in FIG. 12) may transmit DCI having a second DCI format that is configured only with a third SRS resource set associated with the first CORESET pool index value or is configured with both the third SRS resource set associated with the first CORESET pool index value and a fourth SRS resource set associated with the second CORESET pool index value, as described above.

As further shown in FIG. 10, in some aspects, process 1000 may include receiving, in accordance with at least one of the DCI having the first DCI format or the DCI having the second DCI format, a first PUSCH transmission and a second PUSCH transmission that at least partially overlap in a time domain within a component carrier (block 1030). For example, the network node (e.g., using reception component 1202 and/or communication manager 1206, depicted in FIG. 12) may receive, in accordance with at least one of the DCI having the first DCI format or the DCI having the second DCI format, a first PUSCH transmission and a second PUSCH transmission that at least partially overlap in a time domain within a component carrier, as described above.

Process 1000 may include additional aspects, such as any single aspect or any combination of aspects described below and/or in connection with one or more other processes described elsewhere herein.

In a first aspect, the first DCI format is a DCI format 0_1 or a DCI format 0_2, and the second DCI format is the other of the DCI format 0_1 or the DCI format 0_2.

In a second aspect, alone or in combination with the first aspect, the DCI having the second DCI format is configured with both the third SRS resource set and the fourth SRS resource set.

In a third aspect, alone or in combination with one or more of the first and second aspects, the second PUSCH transmission is a Type 1 configured grant PUSCH transmission and is configured with any of the first SRS resource set, the second SRS resource set, the third SRS resource set, or the fourth SRS resource set.

In a fourth aspect, alone or in combination with one or more of the first through third aspects, the second PUSCH transmission is a Type 1 configured grant PUSCH transmission and is configured with the first SRS resource set or the second SRS resource set.

In a fifth aspect, alone or in combination with one or more of the first through fourth aspects, receiving the first PUSCH transmission and the second PUSCH transmission that at least partially overlap in the time domain within the component carrier comprises receiving the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

In a sixth aspect, alone or in combination with one or more of the first through fifth aspects, the DCI having the second DCI format is configured only with the third SRS resource set.

In a seventh aspect, alone or in combination with one or more of the first through sixth aspects, process 1000 includes transmitting an indication not to transmit the DCI having the second DCI format in a CORESET that is associated with the second CORESET pool index value.

In an eighth aspect, alone or in combination with one or more of the first through seventh aspects, the DCI having the second DCI format is only to be transmitted in a CORESET that is associated with the first CORESET pool index value.

In a ninth aspect, alone or in combination with one or more of the first through eighth aspects, process 1000 includes transmitting an indication to transmit the second PUSCH transmission that at least partially overlaps with the first PUSCH transmission based at least in part on the first PUSCH transmission being associated with the DCI having the second DCI format in a CORESET that is associated with the second CORESET pool index value.

In a tenth aspect, alone or in combination with one or more of the first through ninth aspects, process 1000 includes transmitting an indication to transmit the second PUSCH transmission based at least in part on the second PUSCH transmission being scheduled by the DCI having the first DCI format in a CORESET that is associated with the second CORESET pool index value and based at least in part on a scheduling of the first PUSCH transmission by the DCI having the second DCI format in a CORESET that is associated with the second CORESET pool index value.

In an eleventh aspect, alone or in combination with one or more of the first through tenth aspects, the second PUSCH transmission is a Type 1 configured grant PUSCH transmission and is configured with any of the first SRS resource set, the second SRS resource set, or the third SRS resource set.

In a twelfth aspect, alone or in combination with one or more of the first through eleventh aspects, the second PUSCH transmission is a Type 1 configured grant PUSCH transmission and is configured with the first SRS resource set or the second SRS resource set.

In a thirteenth aspect, alone or in combination with one or more of the first through twelfth aspects, receiving the first PUSCH transmission and the second PUSCH transmission that at least partially overlap in the time domain within the component carrier comprises receiving the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

In a fourteenth aspect, alone or in combination with one or more of the first through thirteenth aspects, the configuration information that indicates the first SRS resource set associated with the first CORESET pool index value and the second SRS resource set associated with the second CORESET pool index value includes configuration information for codebook-based and non-codebook-based PUSCH transmissions.

In a fifteenth aspect, alone or in combination with one or more of the first through fourteenth aspects, the first SRS resource set is associated with the first CORESET pool index value based at least in part on the first SRS resource set having an identifier with a value that is lower than a value of an identifier associated with the second SRS resource set, and the second SRS resource set is associated with the second CORESET pool index value based at least in part on the second SRS resource set having the identifier with the value that is greater than the value of the identifier associated with the first SRS resource set.

In a sixteenth aspect, alone or in combination with one or more of the first through fifteenth aspects, the first CORESET pool index value is a CORESET pool index value 0 and the second CORESET pool index value is a CORESET pool index value 1.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
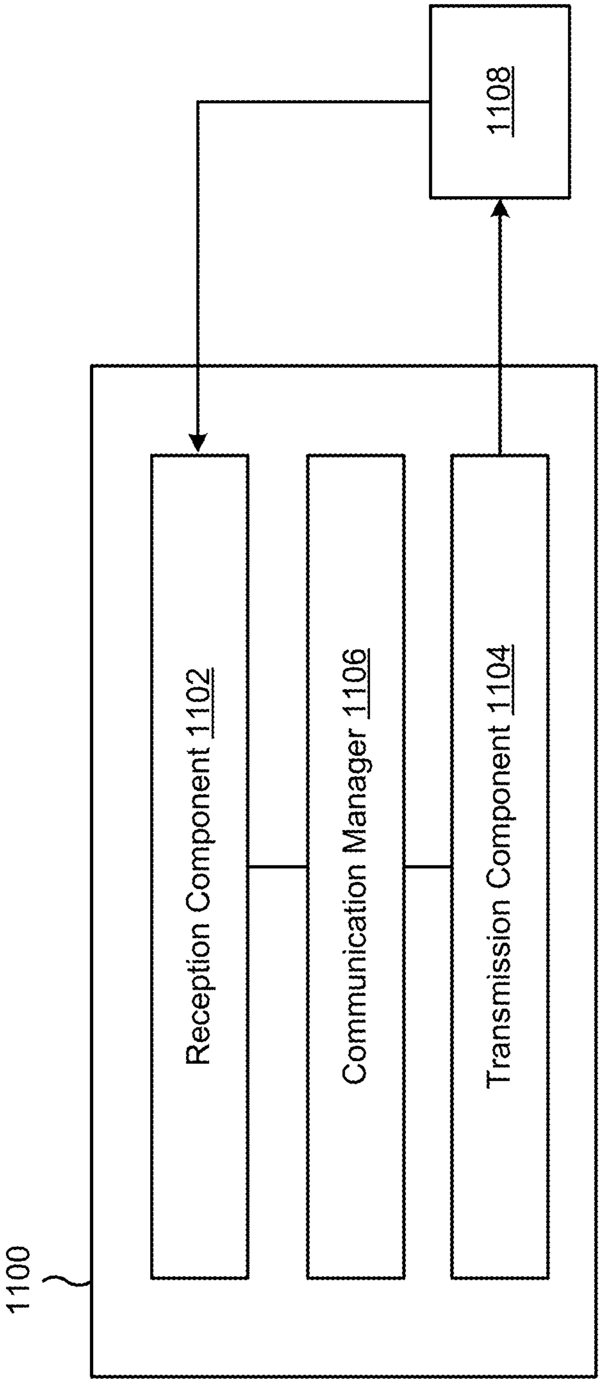
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-9. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may obtain configuration information that indicates, for DCI having a first DCI format, a first SRS resource set associated with a first CORESET pool index value and a second SRS resource set associated with a second CORESET pool index value. The communication manager 1106 may identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value. The transmission component 1104 may selectively transmit, in accordance with at least one of the DCI having the first DCI format or the DCI having the second DCI format, a first PUSCH transmission and a second PUSCH transmission that at least partially overlap in a time domain within a component carrier.

The communication manager 1106 may determine that the UE is not to receive the DCI having the second DCI format in a CORESET that is associated with the second CORESET pool index value. The communication manager 1106 may determine to refrain from transmitting the second PUSCH transmission that at least partially overlaps with the first PUSCH transmission based at least in part on the first PUSCH transmission being associated with the DCI having the second DCI format in a CORESET that is associated with the second CORESET pool index value. The communication manager 1106 may determine to transmit the second PUSCH transmission based at least in part on the second PUSCH transmission being scheduled by the DCI having the first DCI format in a CORESET that is associated with the second CORESET pool index value and based at least in part on the UE being scheduled to transmit the first PUSCH transmission by the DCI having the second DCI format in a CORESET that is associated with the second CORESET pool index value.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
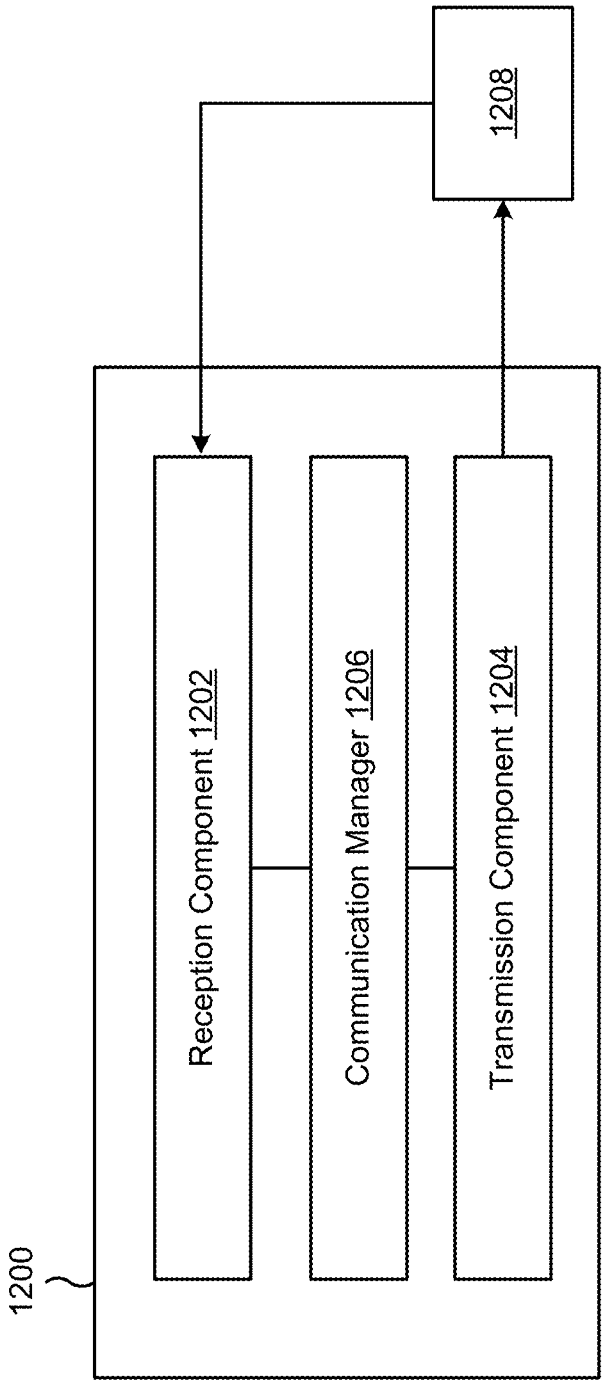
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit configuration information that indicates, for DCI having a first DCI format, a first SRS resource set associated with a first CORESET pool index value and a second SRS resource set associated with a second CORESET pool index value. The transmission component 1204 may transmit DCI having a second DCI format that is configured only with a third SRS resource set associated with the first CORESET pool index value or is configured with both the third SRS resource set associated with the first CORESET pool index value and a fourth SRS resource set associated with the second CORESET pool index value. The reception component 1202 may receive, in accordance with at least one of the DCI having the first DCI format or the DCI having the second DCI format, a first PUSCH transmission and a second PUSCH transmission that at least partially overlap in a time domain within a component carrier.

The transmission component 1204 may transmit an indication not to transmit the DCI having the second DCI format in a CORESET that is associated with the second CORESET pool index value.

The transmission component 1204 may transmit an indication to transmit the second PUSCH transmission that at least partially overlaps with the first PUSCH transmission based at least in part on the first PUSCH transmission being associated with the DCI having the second DCI format in a CORESET that is associated with the second CORESET pool index value.

The transmission component 1204 may transmit an indication to transmit the second PUSCH transmission based at least in part on the second PUSCH transmission being scheduled by the DCI having the first DCI format in a CORESET that is associated with the second CORESET pool index value and based at least in part on a scheduling of the first PUSCH transmission by the DCI having the second DCI format in a CORESET that is associated with the second CORESET pool index value.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: obtaining configuration information that indicates, for downlink control information (DCI) having a first DCI format, a first sounding reference signal (SRS) resource set associated with a first control resource set (CORESET) pool index value and a second SRS resource set associated with a second CORESET pool index value; identifying whether DCI having a second DCI format is configured only with a third SRS resource set associated with the first CORESET pool index value or is configured with both the third SRS resource set associated with the first CORESET pool index value and a fourth SRS resource set associated with the second CORESET pool index value; and selectively transmitting, in accordance with at least one of the DCI having the first DCI format or the DCI having the second DCI format, a first physical uplink shared channel (PUSCH) transmission and a second PUSCH transmission that at least partially overlap in a time domain within a component carrier.

Aspect 2: The method of Aspect 1, wherein the first DCI format is a DCI format 0_1 or a DCI format 0_2, and the second DCI format is the other of the DCI format 0_1 or the DCI format 0_2.

Aspect 3: The method of any of Aspects 1-2, wherein identifying whether the DCI having the second DCI format is configured with the third SRS resource set or is configured with both the third SRS resource set and the fourth SRS resource set comprises identifying that the DCI having the second DCI format is configured with both the third SRS resource set and the fourth SRS resource set.

Aspect 4: The method of Aspect 3, wherein the second PUSCH transmission is a Type 1 configured grant PUSCH transmission and is configured with any of the first SRS resource set, the second SRS resource set, the third SRS resource set, or the fourth SRS resource set.

Aspect 5: The method of Aspect 3, wherein the second PUSCH transmission is a Type 1 configured grant PUSCH transmission and is configured with the first SRS resource set or the second SRS resource set.

Aspect 6: The method of Aspect 3, wherein selectively transmitting the first PUSCH transmission and the second PUSCH transmission that at least partially overlap in the time domain within the component carrier comprises transmitting the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

Aspect 7: The method of any of Aspects 1-6, wherein identifying whether the DCI having the second DCI format is configured with the third SRS resource set or is configured with both the third SRS resource set and the fourth SRS resource set comprises identifying that the DCI having the second DCI format is configured only with the third SRS resource set.

Aspect 8: The method of Aspect 7, further comprising determining that the UE is not to receive the DCI having the second DCI format in a CORESET that is associated with the second CORESET pool index value.

Aspect 9: The method of Aspect 8, wherein the DCI having the second DCI format is only to be received in a CORESET that is associated with the first CORESET pool index value.

Aspect 10: The method of Aspect 7, further comprising determining to refrain from transmitting the second PUSCH transmission that at least partially overlaps with the first PUSCH transmission based at least in part on the first PUSCH transmission being associated with the DCI having the second DCI format in a CORESET that is associated with the second CORESET pool index value.

Aspect 11: The method of Aspect 10, wherein selectively transmitting the first PUSCH transmission and the second PUSCH transmission that at least partially overlap in the time domain within the component carrier comprises refraining from transmitting the second PUSCH transmission based at least in part on the first PUSCH transmission being associated with the DCI having the second DCI format in the CORESET that is associated with the second CORESET pool index value.

Aspect 12: The method of Aspect 7, further comprising determining to transmit the second PUSCH transmission based at least in part on the second PUSCH transmission being scheduled by the DCI having the first DCI format in a CORESET that is associated with the second CORESET pool index value and based at least in part on the UE being scheduled to transmit the first PUSCH transmission by the DCI having the second DCI format in a CORESET that is associated with the second CORESET pool index value.

Aspect 13: The method of Aspect 12, wherein selectively transmitting the first PUSCH transmission and the second PUSCH transmission that at least partially overlap in the time domain within the component carrier comprises transmitting the second PUSCH transmission based at least in part on the second PUSCH transmission being scheduled by the DCI having the first DCI format in the CORESET that is associated with the second CORESET pool index value and based at least in part on the UE being scheduled to transmit the first PUSCH transmission by the DCI having the second DCI format in the CORESET that is associated with the second CORESET pool index value.

Aspect 14: The method of Aspect 7, wherein the second PUSCH transmission is a Type 1 configured grant PUSCH transmission and is configured with any of the first SRS resource set, the second SRS resource set, or the third SRS resource set.

Aspect 15: The method of Aspect 7, wherein the second PUSCH transmission is a Type 1 configured grant PUSCH transmission and is configured with the first SRS resource set or the second SRS resource set.

Aspect 16: The method of Aspect 7, wherein selectively transmitting the first PUSCH transmission and the second PUSCH transmission that at least partially overlap in the time domain within the component carrier comprises transmitting the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

Aspect 17: The method of any of Aspects 1-16, wherein the configuration information that indicates the first SRS resource set associated with the first CORESET pool index value and the second SRS resource set associated with the second CORESET pool index value includes configuration information for codebook-based and non-codebook-based PUSCH transmissions.

Aspect 18: The method of any of Aspects 1-17, wherein the first SRS resource set is associated with the first CORESET pool index value based at least in part on the first SRS resource set having an identifier with a value that is lower than a value of an identifier associated with the second SRS resource set, and the second SRS resource set is associated with the second CORESET pool index value based at least in part on the second SRS resource set having the identifier with the value that is greater than the value of the identifier associated with the first SRS resource set.

Aspect 19: The method of any of Aspects 1-18, wherein the first CORESET pool index value is a CORESET pool index value 0 and the second CORESET pool index value is a CORESET pool index value 1.

Aspect 20: A method of wireless communication performed by a network node, comprising: transmitting configuration information that indicates, for downlink control information (DCI) having a first DCI format, a first sounding reference signal (SRS) resource set associated with a first control resource set (CORESET) pool index value and a second SRS resource set associated with a second CORESET pool index value; transmitting DCI having a second DCI format that is configured only with a third SRS resource set associated with the first CORESET pool index value or is configured with both the third SRS resource set associated with the first CORESET pool index value and a fourth SRS resource set associated with the second CORESET pool index value; and receiving, in accordance with at least one of the DCI having the first DCI format or the DCI having the second DCI format, a first physical uplink shared channel (PUSCH) transmission and a second PUSCH transmission that at least partially overlap in a time domain within a component carrier.

Aspect 21: The method of Aspect 20, wherein the first DCI format is a DCI format 0_1 or a DCI format 0_2, and the second DCI format is the other of the DCI format 0_1 or the DCI format 0_2.

Aspect 22: The method of any of Aspects 20-21, wherein the DCI having the second DCI format is configured with both the third SRS resource set and the fourth SRS resource set.

Aspect 23: The method of Aspect 22, wherein the second PUSCH transmission is a Type 1 configured grant PUSCH transmission and is configured with any of the first SRS resource set, the second SRS resource set, the third SRS resource set, or the fourth SRS resource set.

Aspect 24: The method of Aspect 22, wherein the second PUSCH transmission is a Type 1 configured grant PUSCH transmission and is configured with the first SRS resource set or the second SRS resource set.

Aspect 25: The method of Aspect 22, wherein receiving the first PUSCH transmission and the second PUSCH transmission that at least partially overlap in the time domain within the component carrier comprises receiving the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

Aspect 26: The method of any of Aspects 20-25, wherein the DCI having the second DCI format is configured only with the third SRS resource set.

Aspect 27: The method of Aspect 26, further comprising transmitting an indication not to transmit the DCI having the second DCI format in a CORESET that is associated with the second CORESET pool index value.

Aspect 28: The method of Aspect 27, wherein the DCI having the second DCI format is only to be transmitted in a CORESET that is associated with the first CORESET pool index value.

Aspect 29: The method of Aspect 26, further comprising transmitting an indication to transmit the second PUSCH transmission that at least partially overlaps with the first PUSCH transmission based at least in part on the first PUSCH transmission being associated with the DCI having the second DCI format in a CORESET that is associated with the second CORESET pool index value.

Aspect 30: The method of Aspect 26, further comprising transmitting an indication to transmit the second PUSCH transmission based at least in part on the second PUSCH transmission being scheduled by the DCI having the first DCI format in a CORESET that is associated with the second CORESET pool index value and based at least in part on a scheduling of the first PUSCH transmission by the DCI having the second DCI format in a CORESET that is associated with the second CORESET pool index value.

Aspect 31: The method of Aspect 26, wherein the second PUSCH transmission is a Type 1 configured grant PUSCH transmission and is configured with any of the first SRS resource set, the second SRS resource set, or the third SRS resource set.

Aspect 32: The method of Aspect 26, wherein the second PUSCH transmission is a Type 1 configured grant PUSCH transmission and is configured with the first SRS resource set or the second SRS resource set.

Aspect 33: The method of Aspect 26, wherein receiving the first PUSCH transmission and the second PUSCH transmission that at least partially overlap in the time domain within the component carrier comprises receiving the first PUSCH transmission and the second PUSCH transmission based at least in part on the first PUSCH transmission and the second PUSCH transmission being associated with different SRS resource sets and based at least in part on an SRS resource set associated with the first PUSCH transmission or the second PUSCH transmission not being a subset of the SRS resource set associated with the other of the first PUSCH transmission and the second PUSCH transmission.

Aspect 34: The method of any of Aspects 20-33, wherein the configuration information that indicates the first SRS resource set associated with the first CORESET pool index value and the second SRS resource set associated with the second CORESET pool index value includes configuration information for codebook-based and non-codebook-based PUSCH transmissions.

Aspect 35: The method of any of Aspects 20-34, wherein the first SRS resource set is associated with the first CORESET pool index value based at least in part on the first SRS resource set having an identifier with a value that is lower than a value of an identifier associated with the second SRS resource set, and the second SRS resource set is associated with the second CORESET pool index value based at least in part on the second SRS resource set having the identifier with the value that is greater than the value of the identifier associated with the first SRS resource set.

Aspect 36: The method of any of Aspects 20-35, wherein the first CORESET pool index value is a CORESET pool index value 0 and the second CORESET pool index value is a CORESET pool index value 1.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:

one or more antennas; and a processing system that includes one or more processors and one or more memories that store code for the one or more processors, the processing system configured to cause the UE to:

obtain configuration information that indicates, for downlink control information (DCI) having a first DCI format, a first sounding reference signal (SRS) resource set associated with a first control resource set (CORESET) pool index value and a second SRS resource set associated with a second CORESET pool index value;

identify whether DCI having a second DCI format is configured only with a third SRS resource set associated with the first CORESET pool index value or is configured with both the third SRS resource set associated with the first CORESET pool index value and a fourth SRS resource set associated with the second CORESET pool index value; and selectively transmit, in accordance with at least one of the DCI having the first DCI format or the DCI having the second DCI format, a first physical uplink shared channel (PUSCH) transmission and a second PUSCH transmission that at least partially overlap in a time domain within a component carrier, wherein the second PUSCH transmission is a Type 1 configured grant PUSCH transmission, and wherein transmission of the first PUSCH transmission and the second PUSCH transmission is based at least in part on the first PUSCH transmission and the second PUSCH transmission being associated with different SRS resource sets, wherein the SRS resource set associated with the first PUSCH transmission is associated with the first CORESET pool index value, and wherein the SRS resource set associated with the second PUSCH transmission is associated with the second CORESET pool index value.

2. The UE of claim 1, wherein the first DCI format is a DCI format 0_1 or a DCI format 0_2, and the second DCI format is the other of the DCI format 0_1 or the DCI format 0_2.

3. The UE of claim 1, wherein the processing system, to cause the UE to identify whether the DCI having the second DCI format is configured with the third SRS resource set or is configured with both the third SRS resource set and the fourth SRS resource set, is configured to cause the UE to identify that the DCI having the second DCI format is configured with both the third SRS resource set and the fourth SRS resource set.

4. The UE of claim 3, wherein the second PUSCH transmission is configured with any of the first SRS resource set, the second SRS resource set, the third SRS resource set, or the fourth SRS resource set.

5. The UE of claim 3, wherein the second PUSCH transmission is configured with the first SRS resource set or the second SRS resource set.

6. The UE of claim 3, wherein the processing system, to cause the UE to selectively transmit the first PUSCH transmission and the second PUSCH transmission that at least partially overlap in the time domain within the component carrier, is configured to cause the UE to transmit the first PUSCH transmission and the second PUSCH transmission based at least in part on an SRS resource set associated with the first PUSCH transmission or the second PUSCH transmission not being a subset of the SRS resource set associated with the other of the first PUSCH transmission and the second PUSCH transmission.

7. The UE of claim 1, wherein the processing system, to cause the UE to identify whether the DCI having the second DCI format is configured with the third SRS resource set or is configured with both the third SRS resource set and the fourth SRS resource set, is configured to cause the UE to identify that the DCI having the second DCI format is configured only with the third SRS resource set.

8. The UE of claim 7, wherein the processing system is further configured to cause the UE to determine that the UE is not to receive the DCI having the second DCI format in a CORESET that is associated with the second CORESET pool index value.

9. The UE of claim 8, wherein the DCI having the second DCI format is only to be received in a CORESET that is associated with the first CORESET pool index value.

10. The UE of claim 7, wherein the processing system is further configured to cause the UE to determine to refrain from transmitting the second PUSCH transmission that at least partially overlaps with the first PUSCH transmission based at least in part on the first PUSCH transmission being associated with the DCI having the second DCI format in a CORESET that is associated with the second CORESET pool index value.

11. The UE of claim 10, wherein the processing system, to cause the UE to selectively transmit the first PUSCH transmission and the second PUSCH transmission that at least partially overlap in the time domain within the component carrier, is configured to cause the UE to refrain from transmitting the second PUSCH transmission based at least in part on the first PUSCH transmission being associated with the DCI having the second DCI format in the CORESET that is associated with the second CORESET pool index value.

12. The UE of claim 7, wherein the processing system is further configured to cause the UE to determine to transmit the second PUSCH transmission based at least in part on the second PUSCH transmission being scheduled by the DCI having the first DCI format in a CORESET that is associated with the second CORESET pool index value and based at least in part on the UE being scheduled to transmit the first PUSCH transmission by the DCI having the second DCI format in a CORESET that is associated with the second CORESET pool index value.

13. The UE of claim 12, wherein the processing system, to cause the UE to selectively transmit the first PUSCH transmission and the second PUSCH transmission that at least partially overlap in the time domain within the component carrier, is configured to cause the UE to transmit the second PUSCH transmission based at least in part on the second PUSCH transmission being scheduled by the DCI having the first DCI format in the CORESET that is associated with the second CORESET pool index value and based at least in part on the UE being scheduled to transmit the first PUSCH transmission by the DCI having the second DCI format in the CORESET that is associated with the second CORESET pool index value.

14. The UE of claim 7, wherein the second PUSCH transmission is configured with any of the first SRS resource set, the second SRS resource set, or the third SRS resource set.

15. The UE of claim 7, wherein the second PUSCH transmission is configured with the first SRS resource set or the second SRS resource set.

16. The UE of claim 7, wherein the processing system, to cause the UE to selectively transmit the first PUSCH transmission and the second PUSCH transmission that at least partially overlap in the time domain within the component carrier, is configured to cause the UE to transmit the first PUSCH transmission and the second PUSCH transmission based at least in part on an SRS resource set associated with the first PUSCH transmission or the second PUSCH transmission not being a subset of the SRS resource set associated with the other of the first PUSCH transmission and the second PUSCH transmission.

17. The UE of claim 1, wherein the configuration information that indicates the first SRS resource set associated with the first CORESET pool index value and the second SRS resource set associated with the second CORESET pool index value includes configuration information for codebook-based and non-codebook-based PUSCH transmissions.

18. The UE of claim 1, wherein the first SRS resource set is associated with the first CORESET pool index value based at least in part on the first SRS resource set having an identifier with a value that is lower than a value of an identifier associated with the second SRS resource set, and the second SRS resource set is associated with the second CORESET pool index value based at least in part on the second SRS resource set having the identifier with the value that is greater than the value of the identifier associated with the first SRS resource set.

19. The UE of claim 1, wherein the first CORESET pool index value is a CORESET pool index value 0 and the second CORESET pool index value is a CORESET pool index value 1.

20. A network node, comprising:

one or more antennas; and a processing system that includes one or more processors and one or more memories that store code for the one or more processors, the processing system configured to cause the network node to:

transmit configuration information that indicates, for downlink control information (DCI) having a first DCI format, a first sounding reference signal (SRS) resource set associated with a first control resource set (CORESET) pool index value and a second SRS resource set associated with a second CORESET pool index value;

transmit DCI having a second DCI format that is configured only with a third SRS resource set associated with the first CORESET pool index value or is configured with both the third SRS resource set associated with the first CORESET pool index value and a fourth SRS resource set associated with the second CORESET pool index value; and receive, in accordance with at least one of the DCI having the first DCI format or the DCI having the second DCI format, a first physical uplink shared channel (PUSCH) transmission and a second PUSCH transmission that at least partially overlap in a time domain within a component carrier, wherein the second PUSCH transmission is a Type 1 configured grant PUSCH transmission, and wherein transmission of the first PUSCH transmission and the second PUSCH transmission is based at least in part on the first PUSCH transmission and the second PUSCH transmission being associated with different SRS resource sets, wherein the SRS resource set associated with the first PUSCH transmission is associated with the first CORESET pool index value, and wherein the SRS resource set associated with the second PUSCH transmission is associated with the second CORESET pool index value.

21. The network node of claim 20, wherein the first DCI format is a DCI format 0_1 or a DCI format 0_2, and the second DCI format is the other of the DCI format 0_1 or the DCI format 0_2.

22. The network node of claim 20, wherein the DCI having the second DCI format is configured with both the third SRS resource set and the fourth SRS resource set.

23. The network node of claim 22, wherein the second PUSCH transmission is configured with any of the first SRS resource set, the second SRS resource set, the third SRS resource set, or the fourth SRS resource set.

24. The network node of claim 22, wherein the second PUSCH transmission is configured with the first SRS resource set or the second SRS resource set.

25. The network node of claim 22, wherein the processing system, to cause the network node to receive the first PUSCH transmission and the second PUSCH transmission that at least partially overlap in the time domain within the component carrier, is configured to cause the network node to receive the first PUSCH transmission and the second PUSCH transmission based at least in part on an SRS resource set associated with the first PUSCH transmission or the second PUSCH transmission not being a subset of the SRS resource set associated with the other of the first PUSCH transmission and the second PUSCH transmission.

26. The network node of claim 20, wherein the DCI having the second DCI format is configured only with the third SRS resource set.

27. The network node of claim 26, wherein the processing system is further configured to cause the network node to transmit an indication not to transmit the DCI having the second DCI format in a CORESET that is associated with the second CORESET pool index value.

28. The network node of claim 27, wherein the DCI having the second DCI format is only to be transmitted in a CORESET that is associated with the first CORESET pool index value.

29. A method of wireless communication performed by a user equipment (UE), comprising:

obtaining configuration information that indicates, for downlink control information (DCI) having a first DCI format, a first sounding reference signal (SRS) resource set associated with a first control resource set (CORESET) pool index value and a second SRS resource set associated with a second CORESET pool index value;

identifying whether DCI having a second DCI format is configured only with a third SRS resource set associated with the first CORESET pool index value or is configured with both the third SRS resource set associated with the first CORESET pool index value and a fourth SRS resource set associated with the second CORESET pool index value; and selectively transmitting, in accordance with at least one of the DCI having the first DCI format or the DCI having the second DCI format, a first physical uplink shared channel (PUSCH) transmission and a second PUSCH transmission that at least partially overlap in a time domain within a component carrier, wherein the second PUSCH transmission is a Type 1 configured grant PUSCH transmission; and wherein transmission of the first PUSCH transmission and the second PUSCH transmission is based at least in part on the first PUSCH transmission and the second PUSCH transmission being associated with different SRS resource sets, wherein the SRS resource set associated with the first PUSCH transmission is associated with the first CORESET pool index value, and wherein the SRS resource set associated with the second PUSCH transmission is associated with the second CORESET pool index value.

30. A method of wireless communication performed by a network node, comprising:

transmitting configuration information that indicates, for downlink control information (DCI) having a first DCI format, a first sounding reference signal (SRS) resource set associated with a first control resource set (CORESET) pool index value and a second SRS resource set associated with a second CORESET pool index value;

transmitting DCI having a second DCI format that is configured only with a third SRS resource set associated with the first CORESET pool index value or is configured with both the third SRS resource set associated with the first CORESET pool index value and a fourth SRS resource set associated with the second CORESET pool index value; and receiving, in accordance with at least one of the DCI having the first DCI format or the DCI having the second DCI format, a first physical uplink shared channel (PUSCH) transmission and a second PUSCH transmission that at least partially overlap in a time domain within a component carrier, wherein the second PUSCH transmission is a Type 1 configured grant PUSCH transmission; and wherein transmission of the first PUSCH transmission and the second PUSCH transmission is based at least in part on the first PUSCH transmission and the second PUSCH transmission being associated with different SRS resource sets, wherein the SRS resource set associated with the first PUSCH transmission is associated with the first CORESET pool index value, and wherein the SRS resource set associated with the second PUSCH transmission is associated with the second CORESET pool index value.

* * * * *